(12) United States Patent
Wohl et al.

(10) Patent No.: US 11,746,183 B2
(45) Date of Patent: Sep. 5, 2023

(54) DURABLE CONTAMINATION RESISTANT COATINGS

(71) Applicant: UNITED STATES OF AMERICA AS REPRESENTED BY THE ADMINISTRATOR OF NASA, Washington, DC (US)

(72) Inventors: Christopher J. Wohl, Portsmouth, VA (US); Joseph G. Smith, Jr., Smithfield, VA (US); Devon Beck, Oakland Township, MI (US); Lilly Lynn Balderson, Aylett, VA (US); Yi Lin, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 931 days.

(21) Appl. No.: 16/567,480

(22) Filed: Sep. 11, 2019

(65) Prior Publication Data

US 2020/0079897 A1    Mar. 12, 2020

Related U.S. Application Data

(60) Provisional application No. 62/729,701, filed on Sep. 11, 2018.

(51) Int. Cl.
  *C08G 59/24*    (2006.01)
  *C08L 63/00*    (2006.01)
  (Continued)

(52) U.S. Cl.
  CPC ......... *C08G 59/245* (2013.01); *C08G 59/226* (2013.01); *C08G 59/50* (2013.01);
  (Continued)

(58) Field of Classification Search
  CPC ...... C08L 63/00–10; C09D 163/00–10; C08G 59/50–60
  See application file for complete search history.

(56) References Cited

U.S. PATENT DOCUMENTS 8,221,847 B2    7/2012    Carter
2003/0152785 A1*    8/2003    Sanders ............... C09D 183/04
                                                                428/447
(Continued)

FOREIGN PATENT DOCUMENTS

CN    102815071 A    * 12/2012
EP    0483818 A2    * 5/1992
(Continued)

OTHER PUBLICATIONS

Partial machine translation of CN-102815071-A (2012).*
Sojoudi, H., M. Wang, N.D. Boscher, G. H. McKinley, and K. K. Gleason, Durable and scalable icephobic surfaces: similarities and distinctions from superhydrophobic surfaces. Soft Matter, 2016(12) 7, The Royal Society of Chemistry 1938-1963.

*Primary Examiner* — Kregg T Brooks
(74) *Attorney, Agent, or Firm* — Matthew R. Osenga; Robin W. Edwards; Trenton R. Roche

(57) ABSTRACT

In an illustrative example, one or more coating formulations may be used and may have characteristics useful in different situations. During evaluations, a plurality of coating formulations comprising epoxy resins and diamine hardeners were prepared and evaluated with regards to impact ice adhesion strength and durability. Alone, such coating formulations provided a significantly reduced impact ice adhesion strength as compared to uncoated aluminum and/or stainless steel surfaces. However, a durability of the coatings, when applied to aluminum or stainless steel surfaces, was insufficient to be considered for use on external aircraft surfaces. By including nano-sized and/or micro-sized particles as (Continued)

additives to the coating formulations, resulted in improved durability without significantly reducing ice adhesion performance of the resin base.

**16 Claims, 32 Drawing Sheets
(31 of 32 Drawing Sheet(s) Filed in Color)**

(51) Int. Cl.
    *C08K 5/549*     (2006.01)
    *C08G 59/50*     (2006.01)
    *C09D 163/00*     (2006.01)
    *C08G 59/22*     (2006.01)

(52) U.S. Cl.
    CPC .............. *C08K 5/549* (2013.01); *C08L 63/00* (2013.01); *C09D 163/00* (2013.01); *C08L 2207/53* (2013.01)

(56) References Cited

U.S. PATENT DOCUMENTS

| | | | |
|---|---|---|---|
| 2004/0102574 A1* | 5/2004 | Barber, Jr. ......... | C08G 18/4854 525/124 |
| 2012/0172495 A1* | 7/2012 | Czubarow ............. | H01L 21/563 106/287.18 |
| 2015/0236404 A1* | 8/2015 | Choi ........................ | H01Q 1/38 343/722 |
| 2017/0267871 A1 | 9/2017 | Nowak et al. | |

FOREIGN PATENT DOCUMENTS

| | | | | |
|---|---|---|---|---|
| WO | WO-2008057931 A1 * | 5/2008 | ................ | C08K 3/36 |
| WO | WO-2016090468 A1 * | 6/2016 | ............ | C09D 163/00 |

\* cited by examiner

Polyhedral or cage-like molecular structures known as polyhedral oligosilsesquioxanes (POSS) can be prepared by the hydrolysis of trialkoxysilanes. These compounds are denoted Tn-POSS depending on the number of silicon atoms in the polyhedral cage (e.g. T6, T8, T10, T12, T14, etc), with T8 being the most commonly obtained structure.

T12*

* See FIG. 19 for Description

DURABLE CONTAMINATION RESISTANT COATINGS

CROSS-REFERENCE TO RELATED PATENT APPLICATION(S)

This patent application claims the benefit of and priority to U.S. Provisional Patent Application No. 62/729,701, filed on Sep. 11, 2018, which is titled "Durable Contamination Resistant Coatings," the contents of which are hereby incorporated by reference in their entirety.

STATEMENT REGARDING FEDERALLY SPONSORED RESEARCH OR DEVELOPMENT

The invention described herein was made in the performance of work under a NASA contract and in part by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

In many applications, such as aerospace applications, energy applications, maritime applications, surface contamination arising from environmental factors, such as insects, particulates, and ice accretion can adversely influence the efficiency and performance of aerospace structures, and in some cases can have catastrophic consequences. Illustrative applications include aerodynamic surfaces such as aircraft wings, propeller blades, and/or other leading-edge surfaces. Other applications, such as wind turbine blades, ship surfaces, and the like may also suffer from such contamination. Further, surface contamination resulting from icing of surfaces can dramatically change the weight, drag characteristics, and uniformity of airfoils which, when not properly corrected. Such contamination has caused and has the potential to cause loss of handling of a vehicle, loss of equipment, and/or loss of lives. Some applications may seasonally encounter ice accretion, such as in wind turbine applications, maritime applications, and the like. For example, ice accretion on a propeller blade of a wind turbine used for energy generation may reduce, in many cases significantly reduce, energy harvesting efficiency. Additionally, a ship experiencing icing of surfaces may become increasingly unstable as the thickness of the ice increases. However, in these applications icing events only occur under certain seasonal environmental conditions. In aeronautical and/or aerospace applications, in-flight icing of aircraft surfaces can occur year-round depending on environmental factors.

Current techniques used in the prevention of ice accretion on aircraft surfaces often include "active strategies." Such active strategies often require input of external energy. For example, common current active techniques include heated surfaces, pneumatic boots, and the like. While effective, these active strategies require energy input, which increases a fuel burn of an aircraft, increase a weight of an aircraft, increase manufacturing complexity and, subsequently, increase maintenance complexity. As such, a need has been recognized to mitigate icing of surfaces in energy generation applications, maritime applications, and/or aeronautical applications, such as mitigating in-flight icing.

BRIEF SUMMARY OF THE INVENTION

The present disclosure describes an epoxy coating for use to mitigate icing of surfaces in energy generation applications, maritime applications, and/or aeronautical applications, such as mitigating in-flight icing One illustrative example of the epoxy comprises a diamine, a bisphenol-A based epoxy, and an additive, wherein the additive improves an abrasion resistance of the epoxy resin by at least 40 percent.

Another illustrative example of the epoxy comprises a diamine comprising 1,3-bis(4-aminophenoxy)benzene, a bisphenol-A based epoxy, and a diglycidyl ether comprising at least 35 percent poly(ethylene glycol) diglycidyl ether.

In some cases, the epoxy may include an additive causing a reduction in a wear index of at least 50 percent as compared to the epoxy resin alone. In some cases, the additive may comprise one or both of holey graphene (hG) or core-shell rubber (CSR) particles. The illustrative epoxy may further include an additive causing a reduction of an ice adhesion shear stress by at least 35 percent as compared to the epoxy resin alone. Further, the epoxy resin may include a first additive and a second additive, wherein the first additive and the second additive comprise micro-sized particulates, wherein the first additive comprises hG and the second additive comprises CSR particles. The epoxy resin may include between about 5 percent and about 10 percent of the CSR additive and between about 0.75 percent and about 1 percent of the hG additive.

In some cases, the illustrative epoxy resin may further include an additive component comprising one or more of at least 0.5 percent of a polyhedral oligomeric silsesquioxane (POSS). In some cases, the POSS may comprise one or more of Glycidyl POSS, Trifluoropropyl POSS, or Isooctyl POSS. In an illustrative example, the epoxy resin may have a wear index of at least 190 after 1200 wear cycles based on a Taber abrasion test.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
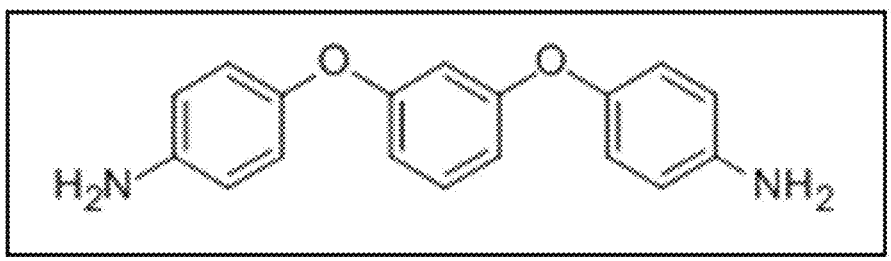
FIGS. 1A-1D are illustrative chemical structures of a polymer coating according to aspects of this disclosure.
Figure 1B:
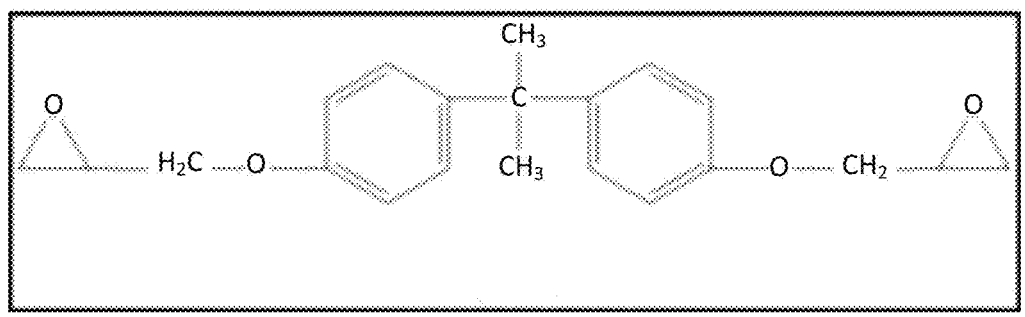

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In some cases, passive strategies may be used to provide anti-icing properties where the input of energy is not required alone or in combination with one or more active strategies to reduce energy requirements associated with ice mitigation in aerospace or other applications. To this end, a variety of materials have been evaluated as coatings for their anti-icing properties. Based on this evaluation, both surface chemical composition and topography were noted to play a role in ice adhesion strength. However, an issue with current materials used in such passive strategies is a lack of the necessary durability to persist as an anti-icing surface long enough to meet the needs of the aviation industry. As such, a need has been recognized to mitigate icing of surfaces in energy generation applications, maritime applications, and/or aeronautical applications, such as mitigating in-flight icing using materials having sufficient durability to meet the needs of industry.

In an illustrative example, one or more coating formulations may be used and may have characteristics useful in different situations. During evaluations, a plurality of coating formulations comprising epoxy resins and diamine hardeners were prepared and evaluated with regards to impact ice adhesion strength and durability. Alone, such coating formulations provided a significantly reduced impact ice adhesion strength as compared to uncoated aluminum and/or stainless steel surfaces. However, durability of the coatings, when applied to aluminum or stainless steel surfaces, was insufficient to be considered for use on external aircraft surfaces. Inclusion of nano-sized and/or micro-sized particles as additives to the coating formulations, resulted in improved durability without significantly reducing ice adhesion performance of the resin base. As will be discussed below, durability improvements were measurable using an abrasion testing device (e.g., a Taber abrasion testing device) having an abrasion surface (e.g., a H18 ceramic wheel) and tested over a high number of cycles (e.g., up to 2400 cycles). Such testing, depending upon a loading level, showed that addition of these additives resulting in improvements in durability (e.g., over 60%, over 70%, over 80%, over 100%, etc.) in some cases. Further, the additives did not cause a significant reduction in ice adhesion performance, as compared to the base resin.

Surface contamination (herein only aerospace surfaces will be discussed such as aircraft wings, propeller blades, wind turbine blades, etc.; however other surfaces that suffer from contamination may equally benefit from the described invention) arising from environmental factors, such as insects, particulates, and ice accretion can adversely influence the efficiency and performance of aerospace structures, and in some cases can have catastrophic consequences. Icing of surfaces in particular can dramatically change the weight, drag characteristics, and uniformity of airfoils which, when not properly corrected, has led to loss of handling, equipment, and lives. Although ice accretion on wind turbines used for energy generation has deleterious results on energy harvesting efficiency, icing events only occur during cold weather. For aircraft, however, in-flight icing can occur year round depending on environmental factors. Prevention of ice accretion on aircraft surfaces is currently performed using "active strategies," that is, strategies requiring the input of external energy. The main active technologies utilized are heated surfaces and pneumatic boots. Although these approaches are effective, they require energy input (thereby increasing fuel burn), increase manufacturing and maintenance complexity, and add weight to the aircraft. Thus, alternative techniques to mitigate in-flight icing are sought. One approach is to utilize "passive strategies". Passive strategies can be used alone as the sole source of anti-icing properties where the input of energy is not required or in combination with active strategies in such a manner that reduces energy requirements. To this end, a variety of materials have been evaluated as coatings for their anti-icing properties. Summarizing these results, it was apparent that both surface chemical composition and topography play a role in ice adhesion strength. The biggest shortcoming of technologies that have shown some promise for ice adhesion prevention is a lack of the necessary durability to persist as an anti-icing surface long enough to meet the needs of the aviation industry.

Epoxy formulations were prepared as coatings and evaluated for impact ice adhesion strength and durability sufficient for potential leading-edge applications. For example, in-flight icing of surfaces results from an impact of super cooled water droplets with a surface of an aircraft. Anti-icing characteristics of such surfaces may be improved, such as by lowering an ice adhesion strength of the surfaces. Lower ice adhesion strength, may allow the ice formed on a surface to be shed by natural vibrations, its own weight, or wind or air passing by the surface. A myriad of epoxy formulations had been developed consisting of a single or multiple sources of epoxide ring functionalities (i.e., epoxy resins), a source of amine functionalities (i.e., hardeners), and other components that either react with the epoxy resin/hardener matrix or incorporated as nonreactive additives in the matrix. The epoxy resins investigated include aromatic resins, largely derivatives of the diglycidyl ether of bisphenol A, and aliphatic resins, largely a poly(ethylene glycol) moiety functionalized with glycidyl (epoxide ring) groups. Hardeners that were evaluated consisted of aromatic diamines.

The nonreactive additives consisted of various allotropes of carbon: carbon nanotubes, graphene, or hG. Holey graphene was determined to exhibit the most promising carbon allotrope due to the unique properties of this nanomaterial and how it interacted with the matrix, as will be discussed in the next section. The second component consisted of CSR particles dispersed in an epoxy resin. These micrometer-sized particles were included to toughen the epoxy matrix. The third component consisted of a series of functionalized POSS where the functionalization was aliphatic or fluorinated functionalities or ethylene glycol oligomers for the expression of hydrophobic or hydrophilic properties, respectively.

The use of hG in these formulations provides two distinct, unique features. First, as a result of how the hG is generated, through controlled partial oxidation of defect-rich sites in graphene, there are a significant number of high energy functionalities on the perimeter of the holey graphene sheet. The presence of these high energy functionalities enables better dispersion in the resin formulation relative to a hG sheet without these functionalities. Since the process generating the holes is specific to defect-rich sites, the desirable mechanical properties of the graphene are largely maintained. The good dispersion within the matrix provided by the functionality-enriched hG enables the mechanical properties of the graphene to be imparted into the formulation as a whole to a greater extent than would be possible with a poorly dispersed material. Second, as a result of the holes present in hG, this reinforcing agent can be fully integrated into the epoxy resin, with resin flowing through the openings in the graphene sheet, further enabling translation of the mechanical properties of the graphene into the surrounding matrix.

Core-shell rubber micro particles are often utilized as a toughening agent in epoxy matrices. What is unique to the inclusion of these particles in the described coating formulation is that the micro particles act as an impact force dissipation agent. Specifically, these particles impart a surface with a heterogeneous elastic modulus such that, upon impact of a high-speed contaminant, regions of the surface would be depressed while other would retain their orientation. This would impart instability in the expanding liquid causing reduced adhesion with the impacted substrate. This compression would also work to dissipate the impact force further reducing available energy for adhesion.

The POSS species utilized in the formulations described here impart several unique features to these coatings. First, the hydrophobic functionalization present on POSS materials (aliphatic and fluorinated species) will preferentially surface migrate resulting in greater surface concentration than what would be present if this material were dispersed uniformly throughout the resin. These species would reduce adhesion interaction with the coating and may provide surface lubricity to improve abrasion resistance. The surface will also be mechanically reinforced as a result of the high density of POSS present. Hydrophilic POSS species consists of chemical functionalities that are known to act as freezing point suppressants. Also, the nature of these functionalities would enable these materials to be readily dispersed through the matrix and contribute to improving the mechanical durability of the coating overall.

The epoxy resin itself, having a combination of aromatic and aliphatic species provides a novel juxtaposition of rigidity for the purpose of providing a durable coating and flexibility to impart defects in ice crystals that form upon impact of super-cooled water droplets. Further, the flexible aliphatic portions may also provide surface lubricity for improved abrasion resistance. Further, inclusion of poly (ethylene glycol) with glycidyl ether (epoxide ring) functionalities may further work to suppress the freezing point of supercooled water droplets and may impart defects in forming ice crystals. Both of these interactions would reduce ice adhesion strength.

In some cases, such coatings may be used in one of multiple industries where icing may be of issue, such as in aviation applications (e.g., general aviation, commercial aviation, military aviation, etc.) to prevent icing of surfaces of aviation vehicles such as airplanes, helicopters, drones and the like. In some cases, such coatings may be used in marine applications (e.g., naval vessels, commercial vessels, cruise ships, fishing vessels, etc.) such as to prevent icing of vessels in cold weather situations. Other industrial applications may also find use in such coatings, such as wind energy application to prevent icing on one or more portions of wind turbines (e.g., rotor blades, etc.). In some cases, other applications may be anticipated such as building exterior surfaces, pavement surfaces and the like.

Coating formulations were prepared by adding all the components in an appropriate order along with a solvent, if necessary. Typical solvents utilized were N-methyl-2-pyrrolidone, N,N-dimethyl formamide, methyl amyl ketone, methyl ethyl ketone, etc. Once all components were combined, mechanical agitation, ultrasonication, or other means of generating a homogeneous solution were employed. This was followed by heating at approximately 70-100° C. to partially cure the formulation, a process referred to as B-staging where the reaction is "advanced" from the starting monomers to oligomeric species. Once the viscosity of the formulation increased such that a stir rod, when submerged in the liquid, would retain a film thickness noticeably greater than the diameter of the stir rod, indicating the advance state of the solution, the formulation was removed from the heat and allowed to cool to room temperature. Once cooled, the solution was spread on prepared aluminum coupons (though any substrate composition could be envisioned) followed by degassing the material under reduced pressure, if necessary. The coated coupon was subsequently heated up to 177° C. to fully cure the epoxy formulation.

Coated test blanks (e.g., coupons) were characterized using contact angle goniometry, Taber abrasion testing, impact testing, impact ice adhesion, and insect impact to assess the viability of the formulation for prevention of contaminant adhesion and persistence as a durable coating. The results of these tests are discussed below.

As shown in FIG. 1, an illustrative polymer coating may comprise an aromatic system comprising a diamine, a bisphenol-A based epoxy, a diglycidyl ether, and a solvent. In some cases, one or more additives may also be included, such as to improve one or more physical characteristics of the coating once cured. For example, FIG. 1A shows an illustrative aromatic diamine, (e.g., 1,3-Bis(4-aminophenoxy)benzene (1,3,4-APB)), FIG. 1B shows an illustrative Bisphenol-A based epoxy (e.g., DER™ 331), FIG. 1C shows an illustrative diglycidyl ether (e.g., Poly(ethylene glycol) diglycidyl ether (PEG-DGE)), and FIG. 1D shows an illustrative solvent (e.g., N,N-Dimethylformamide (DMF)). Illustrative additives may include hG and/or nano-sized or micro-sized CSR particles, such as Kaneka Kane Ace™ MX-125, as discussed below.

An aromatic ether diamine, such as 1,3,4-APB as shown in FIG. 1A, are often used as a monomer for heat-resistant high molecular weight polymers, particularly as a raw material for polyamides and polyimides. Aromatic diamines have been widely used in the fields of high-performance high polymers, such as p-phenylenediamine for the production of Kevlar®, m-phenylenediamine for the production of Nomex®, and 4,4'-oxydianiline for the production of Kapton®. 1,3-Bis(4-aminophenoxy)benzene is useful as a raw material for especially adhesive polyimide resin, and polyether-polyamines useful as a raw material for heat-resistant polymer, especially polyimide. While 1,3,4-APB is discussed, other aromatic ether diamines may also be used.

Liquid epoxy resins are used in many applications such as coatings, adhesives, and as a component of composite materials. The illustrative general purpose epoxy resin shown in FIG. 1B, DER™ 331 liquid epoxy resin, is a liquid reaction product of epichlorohydrin and bisphenol A. A wide variety of curing agents is available to cure liquid epoxy resins at ambient conditions, such as aliphatic polyamines, polyamides, amidoamines, cycloaliphatic amines and/or modified versions of these curing agents. Curing may also be done at an elevated temperature to improve selected properties such as chemical resistance and glass transition temperature. If anhydride or catalytic curing agents are employed, elevated temperature cures are necessary and long post-cures are required to develop full end properties. While DER™ 331 is discussed, other such liquid epoxy resins may be used.

Figure 1C:
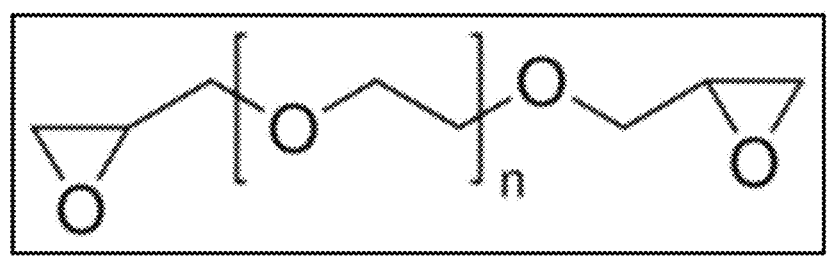

The aromatic system comprising the polymer coating may also include a diglycidyl ether, such as PEG-DGE as shown in FIG. 1C. In some cases, the diglycidyl ether may be highly solubility in water so that it may easily undergo hydrolysis followed by ring cleavage reaction in aqueous solution to yield a hydroxyl group. The illustrative diglycidyl ether, such as PEG-DGE, may combine with proteins covalently or non-covalently. Additionally, the diglycidyl ether may be useful for cross linking and or as a surface modifier. While PEG-DGE is discussed, other such diglycidyl ethers may be contemplated.

Figure 1D:
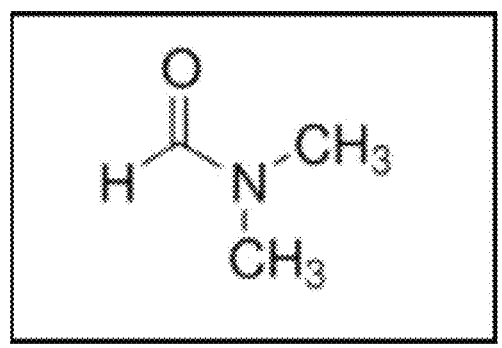

The polymer coating may also include a solvent to facilitate chemical reactions, such as N,N-Dimethylformamide (DMF), as shown in FIG. 1D. DMF is an organic compound with the formula $(CH3)2NC(O)H$ that is miscible with water and the majority of organic liquids.

Figure 2:
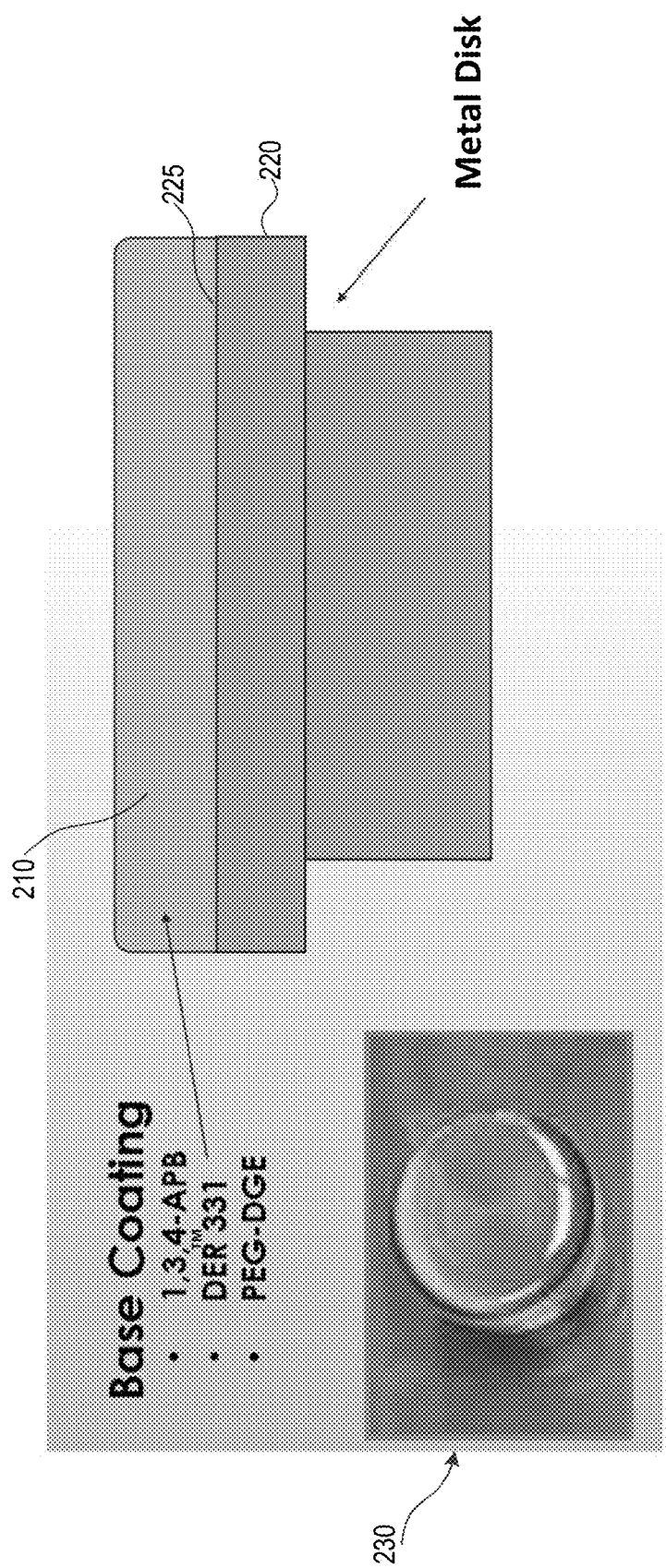
FIG. 2 is an illustrative block diagram of a testing blank coated with a base polymer coating according to aspects of this disclosure.

FIG. 2 is an illustrative block diagram of a testing blank 220 coated with a base polymer coating 210 according to aspects of this disclosure. For example, the illustrative base polymer coating 210, such as one comprising 1,3,4-APB, DER™ 331, and PEG-DGE, may be applied and cured to a top surface 225 of the testing blank 220, such as a testing blank useful in abrasion testing, ice adhesion testing and the like. A top view of the illustrative blank is shown at 230. While DMF, is discussed, other such solvents may be contemplated.

Figure 3:
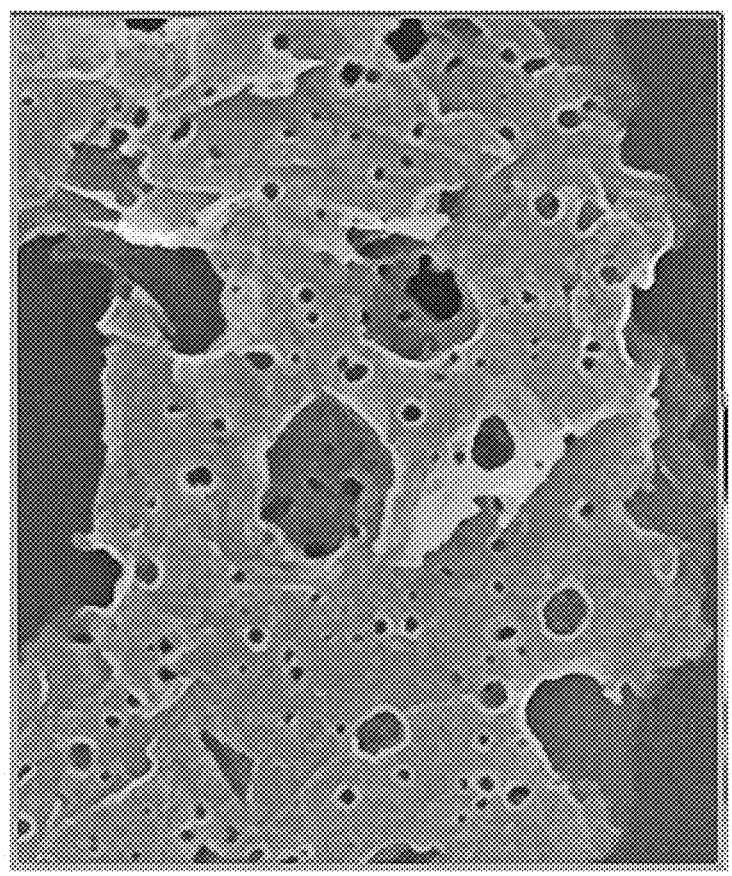
FIG. 3 is an illustrative view of a structural characteristics of hG.
Figure 4:
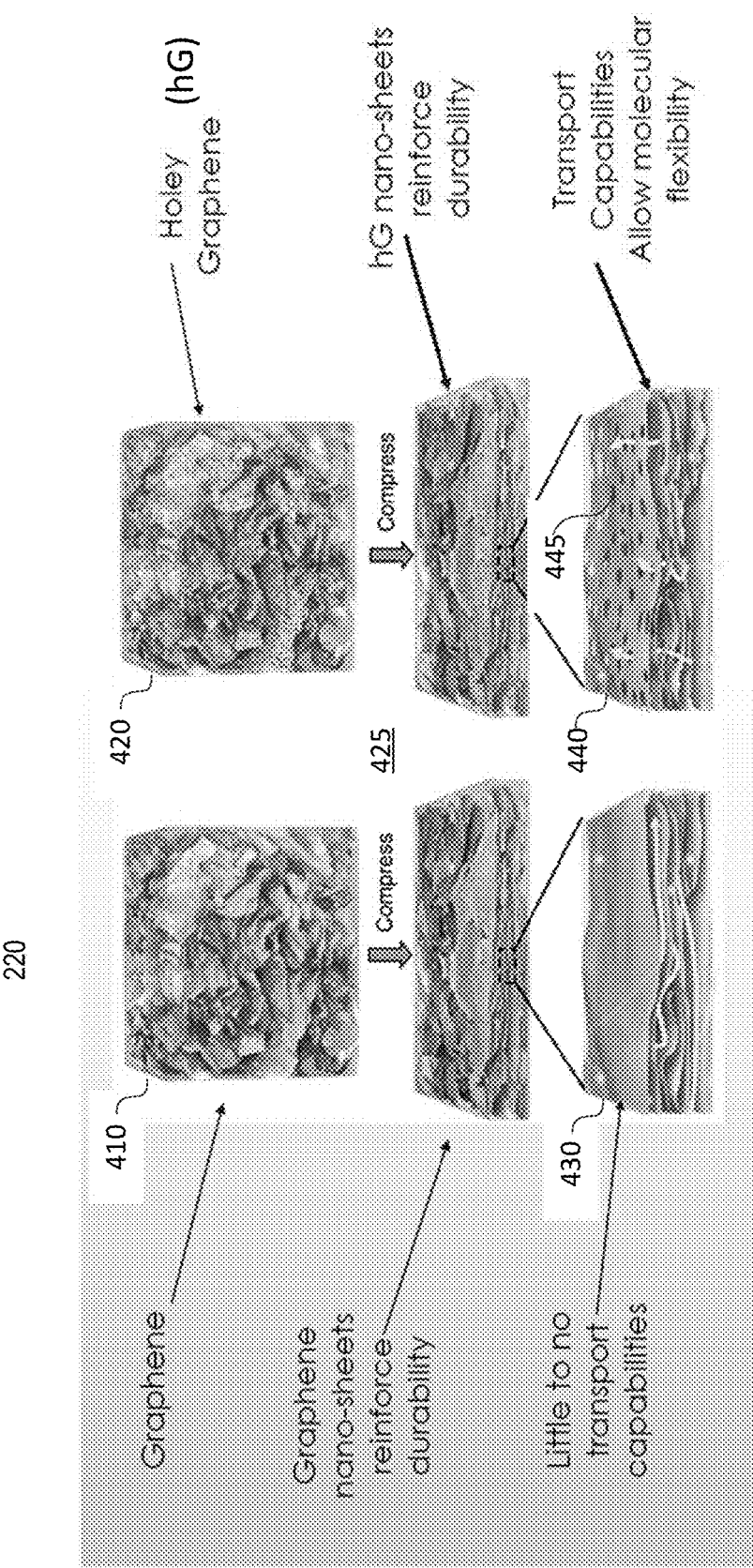
FIG. 4 shows an illustrative comparison of transport capabilities of graphene and hG.

FIG. 3 is an illustrative view of a structural characteristics of hG. Holey graphene, also called graphene nanomesh, is a structural derivative of graphene. In some cases, hG may be formed by removing a large number of atoms from the graphitic plane to produce holes distributed on and through the atomic thickness of the graphene sheets. These holes may include abundant functional groups around their edges, impart properties that are uncommon to intact graphene sheets but advantageous toward various applications. For example, the functional groups may be ideal for polymer interaction. Beneficial properties of hG may include high electrical conductivity, high thermal conductivity, high mechanical strength, thermal stability, chemical stability, and the like. In some cases, hG may allow for modification flexibility and may facilitate through-plane transport, as shown in FIG. 4. For example, in FIG. 4, a volume of graphene sheets 410 and a volume of hG sheets 420 may be compressed 425 to reinforce durability. However, the compressed graphene sheets 430 may offer little to no molecular transport capability through the volume of compressed graphene sheets. In contrast, the compressed hG sheets 440 may allow for molecular flexibility via the transport capabilities through the volume accorded by the holes 445.

Figure 5:
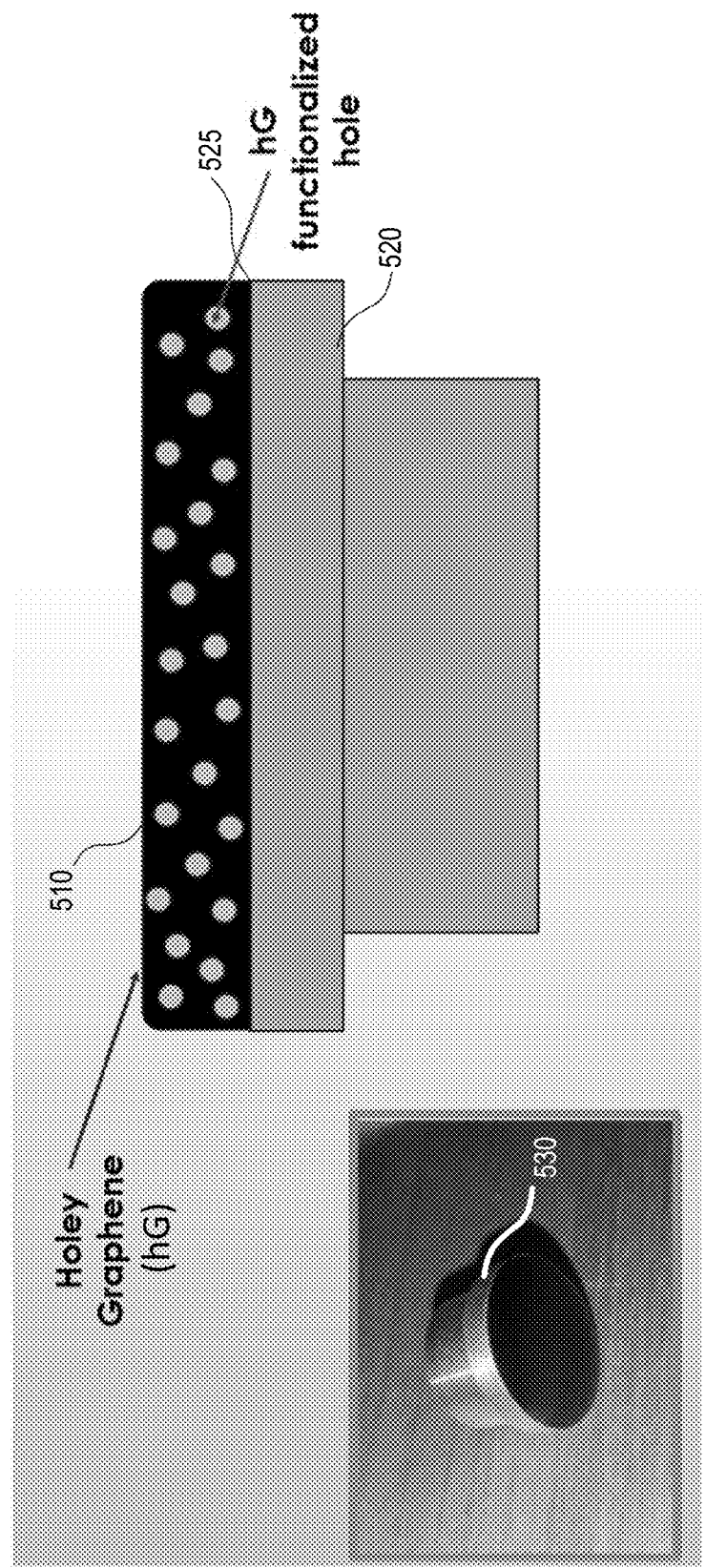
FIG. 5 is an illustrative block diagram of a testing blank coated with a base polymer coating with a hG additive, according to aspects of this disclosure.

FIG. 5 is an illustrative block diagram of a testing blank 520 coated with a base polymer coating with a hG additive 510, according to aspects of this disclosure. For example, the illustrative base polymer coating 510, such as one comprising 1,3,4-APB, DER™ 331, and PEG-DGE, may also include an additive, such as hG. As shown, the molecular transport capabilities of the holes in the hG additive may allow for better integration of the hG additive with the base polymer coating. This modified coating may be applied and cured to a top surface 525 of the testing blank 520, such as a testing blank useful in abrasion testing, ice adhesion testing and the like. A side view of an illustrative test blank is shown at 530.

Figure 6:
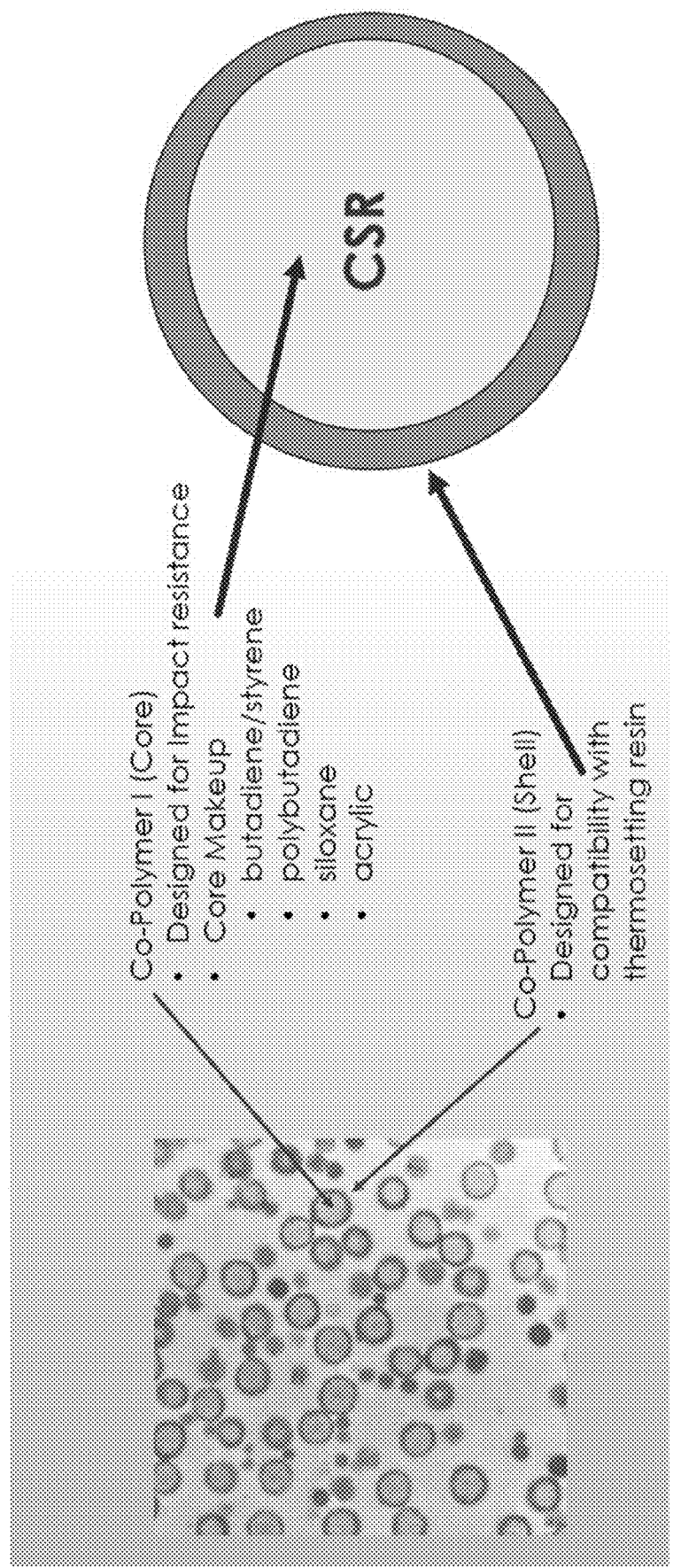
FIG. 6 shows an illustrative view of CSR particles according to aspects of this disclosure.

FIG. 6 shows an illustrative additive (e.g., CSR particles) to the base polymer according to aspects of this disclosure. For example, a core-shell enhancement material for thermosetting resins may be used, such as to increase a durability of the base polymer coating, as discussed above in FIGS. 1 and 2. An illustrative core-shell enhancement material may be incorporated in a resin base to enhance dispersion of particles in the base polymer coating. For example, Kaneka Kane Ace™ MX-125 Bisphenol A, Liquid Epoxy Resin is a concentrate comprised of about 25% by weight of CSR particles dispersed in a thermosetting resin to allow the CSR particles to remain uniformly dispersed in the base polymer coating. The CSR particles may be small (e.g., 100 nm). While a 25% concentration of CSR particles is discussed, other concentrations of particles may be contemplated. The CSR in unmodified liquid epoxy resin based on bisphenol-A, such as the base polymer coat discussed above, may act as a toughening agent. It exhibits improved fracture toughness, lap shear strength, and durability without sacrificing glass transition temperature or other thermal properties related to the cross-link density. Further, properties of such additives may include an increased fracture toughness, an increased lap-shear strength, a low ionic and surfactant content, and may exhibit an even distribution of particles throughout the resin and/or may relieve curing stress. The copolymer core of the particles may be designed for impact resistance and may be made of one or more of butadiene/styrene, polybutadiene, siloxane, acrylic and the like. Further, the shell of the particles may be designed for compatibility with thermosetting resins.

Figure 7:
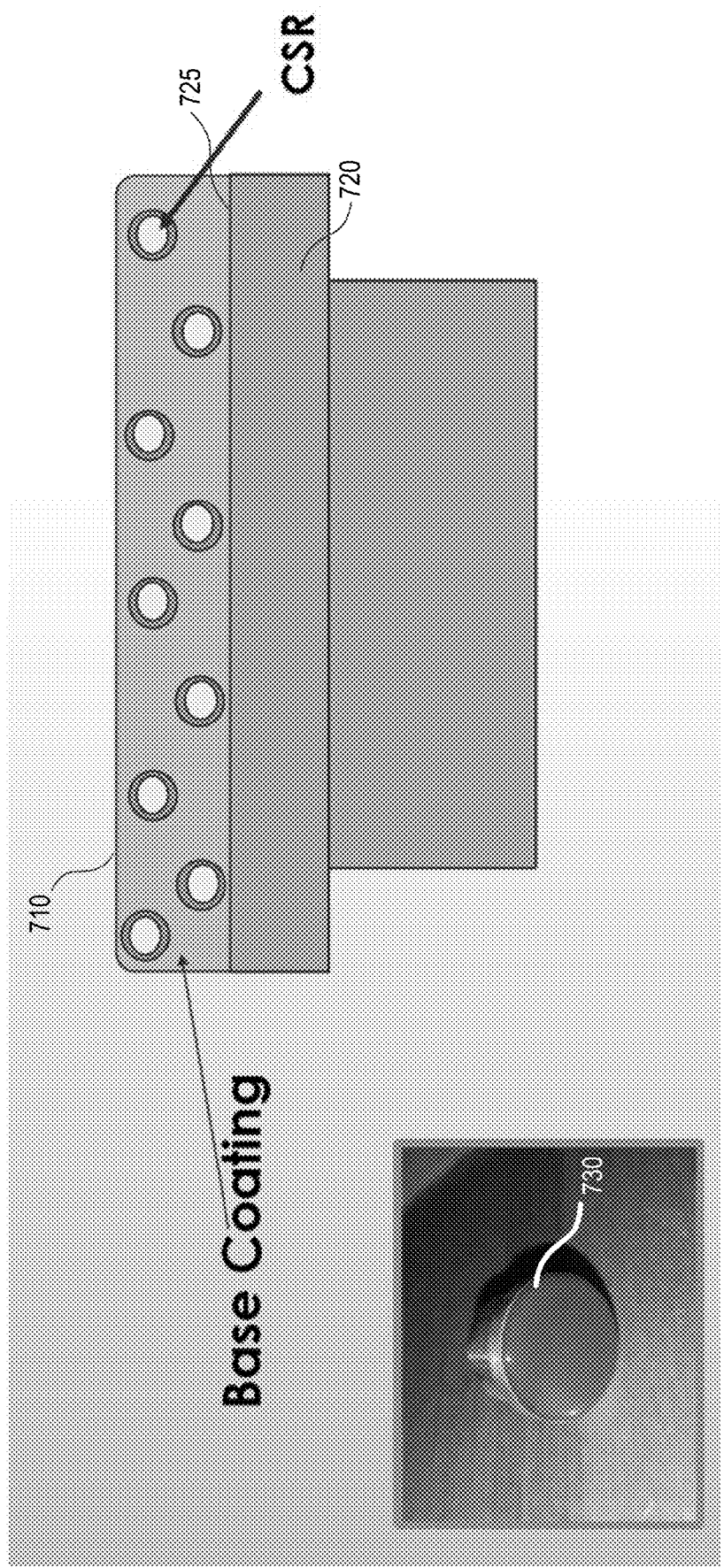
FIG. 7 shows characteristics of the CSR particles used to increase durability of a base polymer coating according to aspects of this disclosure.

FIG. 7 shows an illustrative block diagram of a testing blank 720 coated with a base polymer coating with CSR particle additive 710, according to aspects of this disclosure. For example, the illustrative base polymer coating 710, such as one comprising 1,3,4-APB, DER™ 331, and PEG-DGE, may also include an additive, such as the CSR particles discussed above. This modified coating may be applied and cured to a top surface 725 of the testing blank 720, such as a testing blank useful in abrasion testing, ice adhesion testing and the like. A side view of an illustrative test blank is shown at 730.

Figure 8B:
FIGS. 8A and 8B show images captured after conclusion of ice adhesion testing according to aspects of the disclosure.
Figure 8A:
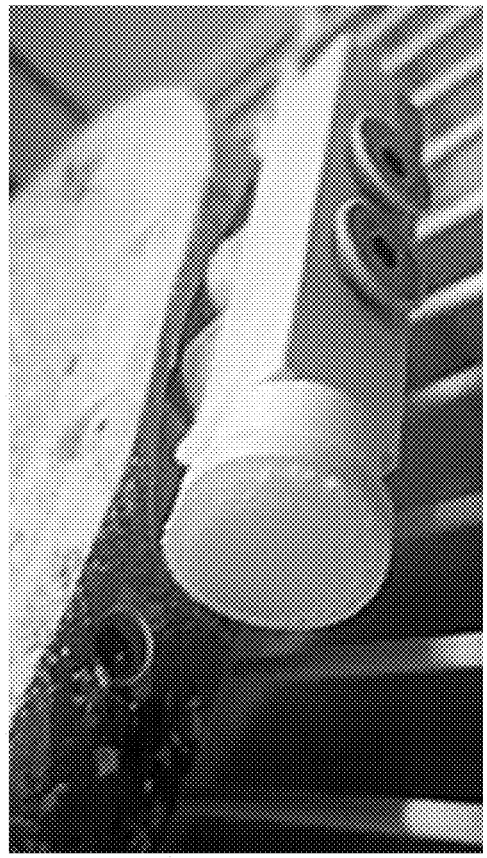
Figure 9:
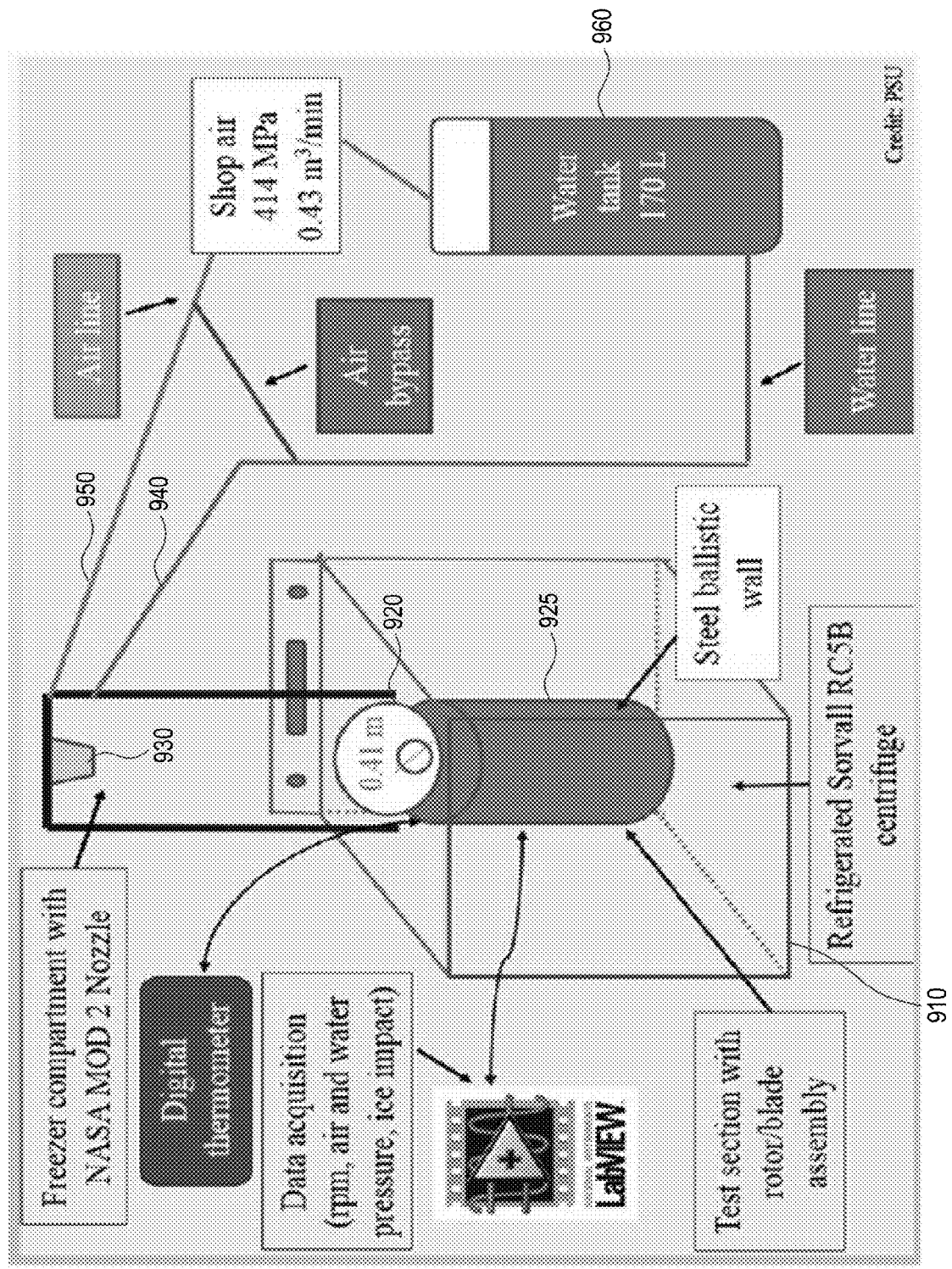
FIG. 9 is a block diagram representation of an adverse environment rotor test stand used for ice adhesion testing according to aspects of this disclosure.

FIGS. 8A and 8B show images captured after conclusion of ice adhesion testing and FIG. 9 is a block diagram representation of an adverse environment rotor test stand used for ice adhesion testing according to aspects of this disclosure. The ice adhesion testing environment simulates conditions that may cause aircraft impact icing while a rotor 920 spins samples at a high rate of speed, such as approximately 5500 revolutions per minute. Such testing includes both a live blade and a dead blade configuration on opposing sides of a rotor. The experimental testing was performed using testing blanks, such as those discussed with respect to FIGS. 2, 5, and 7 such that comparisons may be made between the different coating formulations, with and without additives. Each sample was run three times at −16° C., −12° C., and −8° C. Ice adhesion testing may be used to calculate ice adhesion shear strength (LASS), such as by using the formula IASS=$F_c$/(Shed Area), where $F_c=M_{ice}*a_c$, where $F_c$ is the centrifugal force, $m_{ice}$ is the mass of the shed ice, and $a_c$ is the centrifugal acceleration.

Figure 10A:
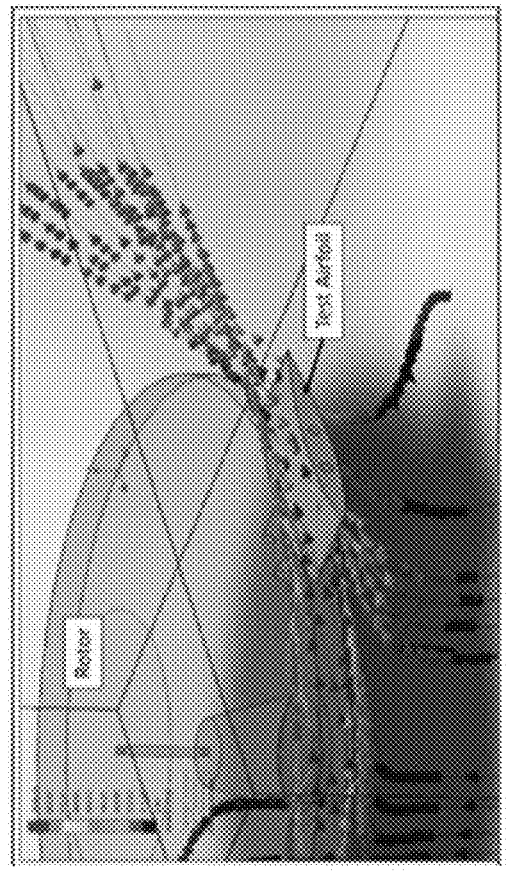
FIG. 10A shows airflow over an airfoil attached to a rotor under test using the adverse environment rotor test stand according to aspects of this disclosure.
Figure 10B:
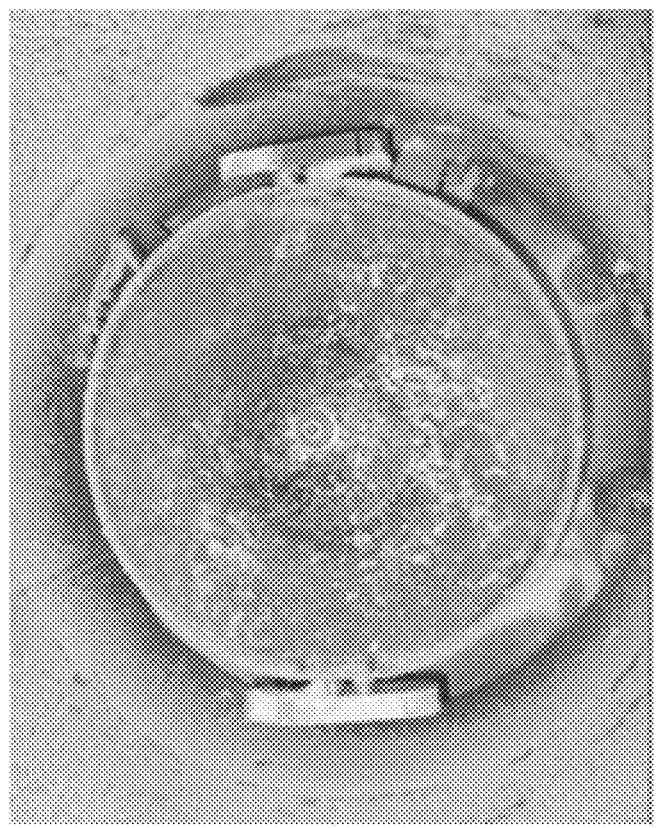
FIG. 10B shows illustrative test results of a rotor under test using the adverse environment rotor test stand according to aspects of this disclosure.

The illustrative adverse environment rotor test stand (AERTS) of FIG. 9 may comprise a refrigerated centrifuge 910 having a test section with a rotor assembly 920, a steel ballistic wall 925, and a freezer compartment with a nozzle 930 for introducing water droplets into the interior of the refrigerated centrifuge 910. In some cases, the nozzle 930 may be connected to one or more lines, such as the water line 940 and the air line 950. In some cases, the water line 940 may supply water from a tank 960 or other water source. In some cases, the air line 950 may provide ambient air at predetermined air pressure. In the illustrative example of FIG. 9, the shop air may be provided at approximately 414 MPa, at a rate of 0.43 m$^3$/minute. FIG. 10A shows an illustration of airflow over an airfoil attached to the rotor under test in the AERTS with interaction of the introduced water droplets by the nozzle 930. FIG. 10B shows an image, post-test, showing ice that had been shed from the sample blade. For example, ice shed on wall is evident from smudge area above the sample blade. Also, ice is evident on the reference blade.

Figure 11B:
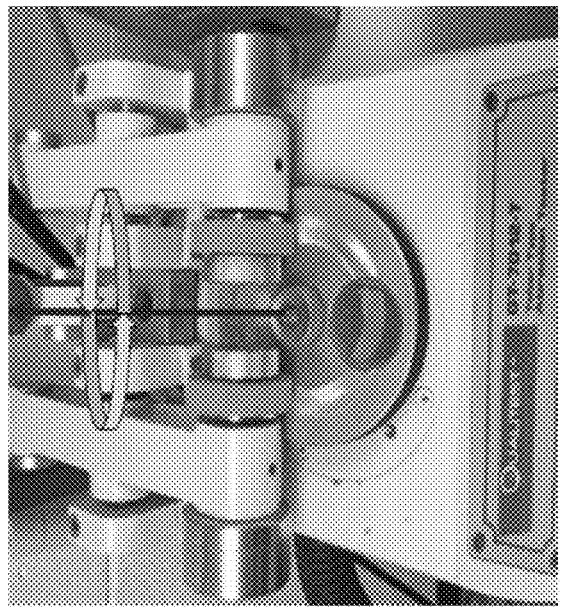
FIGS. 11A, 11B, and 11C show testing blanks resulting from abrasion testing of polymer blends according to aspects of this disclosure.
Figure 11C:
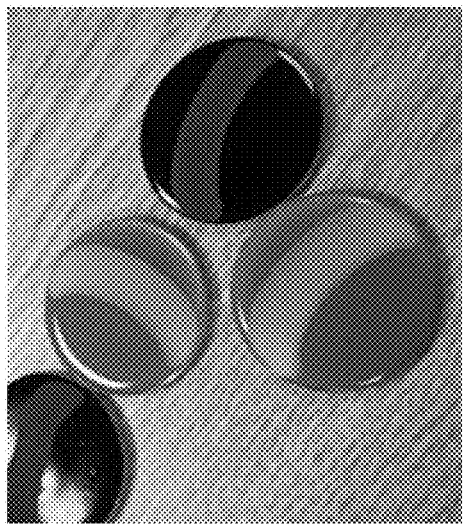
Figure 11A:
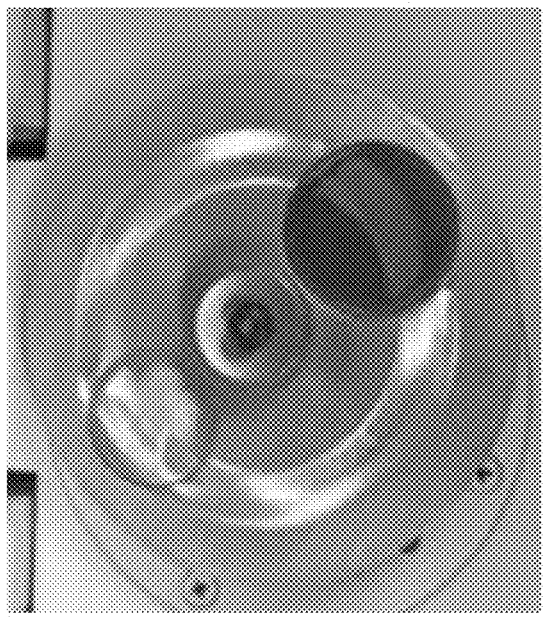

FIGS. 11A, 11B and 11C show testing blanks resulting from abrasion testing of polymer blends according to aspects of this disclosure. For example, FIG. 11A shows an illustrative coated test blank mounted on a rotating table of a Taber testing device, FIG. 11B shows a rotation direction of the rotating table to subject the coated and mounted test blank to abrasion by one or more abrasive wheels, and FIG. 11C shows a plurality of coated test blanks showing a pattern of wear after being subjected to Taber abrasion testing.

Figure 18:
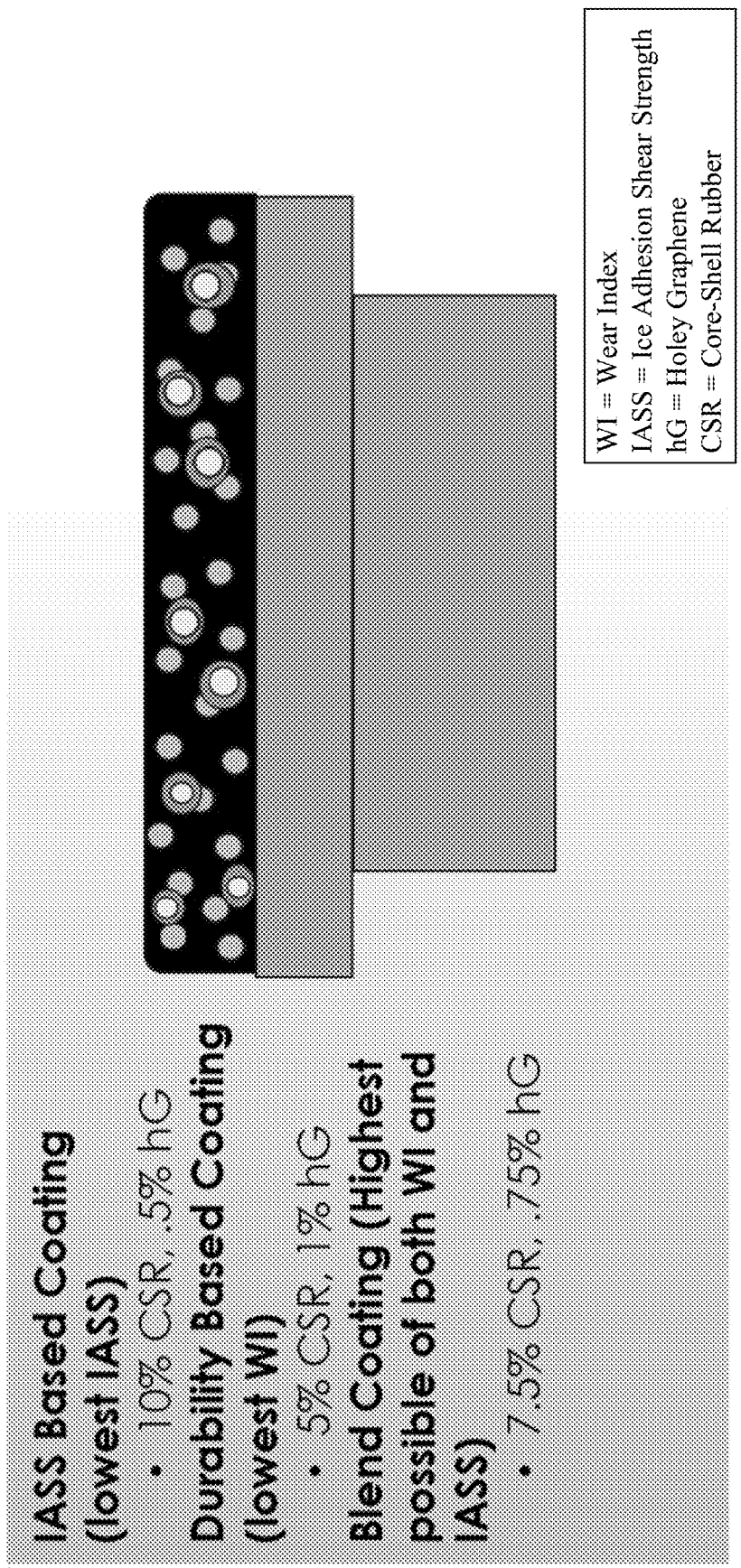
FIG. 18 is an illustrative block diagram of a testing blank coated with a base polymer coating with a mixed composition of additives of both CSR particles and hG additives, according to aspects of this disclosure.

In the illustrative test a plurality of testing blanks may be prepared. In some cases, one or more control test blanks may be prepared without a coating thus leaving a metal surface to be subject to abrasion testing as a first control measure. In some cases, one or more base coating test blanks may be prepared with a coating of the base polymer cured on a top surface of a test blank (e.g., a base test blank) comprising a combination of two or more of the selected diamine (e.g., 1,3,4-APB), the selected bisphenol-A based epoxy (e.g., DER™ 331), the selected diglycidyl ether (e.g., PEG-DGE), as shown in FIG. 2. In some cases, one or more hG additive test blanks may be prepared with a coating of the base polymer with a hG additive cured on a top surface of a test blank (e.g., a base test blank) comprising at least the selected diamine (e.g., 1,3,4-APB), the selected bisphenol-A based epoxy (e.g., DER™ 331), the selected diglycidyl ether (e.g., PEG-DGE), and a selected concentration of the hG additive (e.g., within a range from near 0% to about 0.1% percent, within a range from about 0.15% to about 0.25%, within a range from about 0.25% to about 0.5%, within a range from about 0.5% to about 1.0% or greater, and the like), as shown in FIG. 5. In some cases, one or more CSR additive test blanks may be prepared with a coating of the base polymer with a CSR additive cured on a top surface of a test blank (e.g. a base test blank) comprising at least the selected diamine (e.g., 1,3,4-APB), the selected bisphenol-A based epoxy (e.g., DER™ 331), the selected diglycidyl ether (e.g., PEG-DGE), and a selected concentration of the CSR additive (e.g., within a range from near 0% to about 1% percent, within a range from about 1% to about 2%, within a range from about 2% to about 5%, within a range from about 5% to about 10% or greater, and the like), as shown in FIG. 7. In some cases, one or more CSR additive and hG additive test blanks may be prepared with a coating of the base polymer with a CSR additive and an hG additive cured on a top surface of a test blank (e.g. a base test blank) comprising at least the selected diamine (e.g., 1,3,4-APB), the selected bisphenol-A based epoxy (e.g., DER™ 331), the selected diglycidyl ether (e.g., PEG-DGE), and a selected concentration of the CSR additive and the hG additive, as shown in FIG. 18.

In experimental results, the test blanks were subjected to a controlled series of tests based on a series of abrasion parameters, pressure parameters, and number of cycles to determine the wear index (WI) of epoxy based coatings. An illustrative test included coating a number of metal (e.g., aluminum (Al)) test blanks, such as a Taber testing disk with a predetermined polymer coating with and without additives. Additionally, uncoated metal test blanks were tested as a control to provide an indication of wear for the uncoated metal surface. In the illustrative tests, the coated and uncoated Al Taber test disks were abraded for 3 rounds at about 400 cycles by the Taber wheel.

A Taber testing device may include a rotating turntable upon which specimens can be subjected to the abrasion action of two abrasive wheels. When driven, the wheels produce abrasion marks that form a pattern of crossed arcs over a circular ring approximately 30 square centimeters. In doing so, the abrasion pattern shows an abrasion resistance of the substance under test at all angles relative to the weave or grain of the material. Taber abrasion testing provides a standard for wear and abrasion research, quality and process control, materials evaluation, and product development, where the Taber testing device provides reliable and repeatable data within a short period of time as opposed to wear experienced in real-world use testing.

During the noted tests, a Taber wheel designed for abrading metal having a selected abrasive content (e.g., a ceramic H-18 Taber wheel) was used to determine the WI for various samples. The WI, in microns, may be calculated based on a difference in the coating thickness as determined from a weight taken before the testing and a weight taken after the testing, and multiplied by a thousand, such by using the formula:

$$WI=((A-B)*1000)/C, \text{ where:}$$

A=weight of the test specimen before abrasion (in milligrams);

B=weight of the test specimen after abrasion (in milligrams); and

C=number of cycles of abrasion recorded.

Durability of coatings may be determined using the wear index, where a lower WI value indicates a more durable coating. In some cases, when calculating the WI for coated test blanks, the last 200 cycles may be discarded because the results may be affected by abrasion of an exposed substrate.

Figure 12:
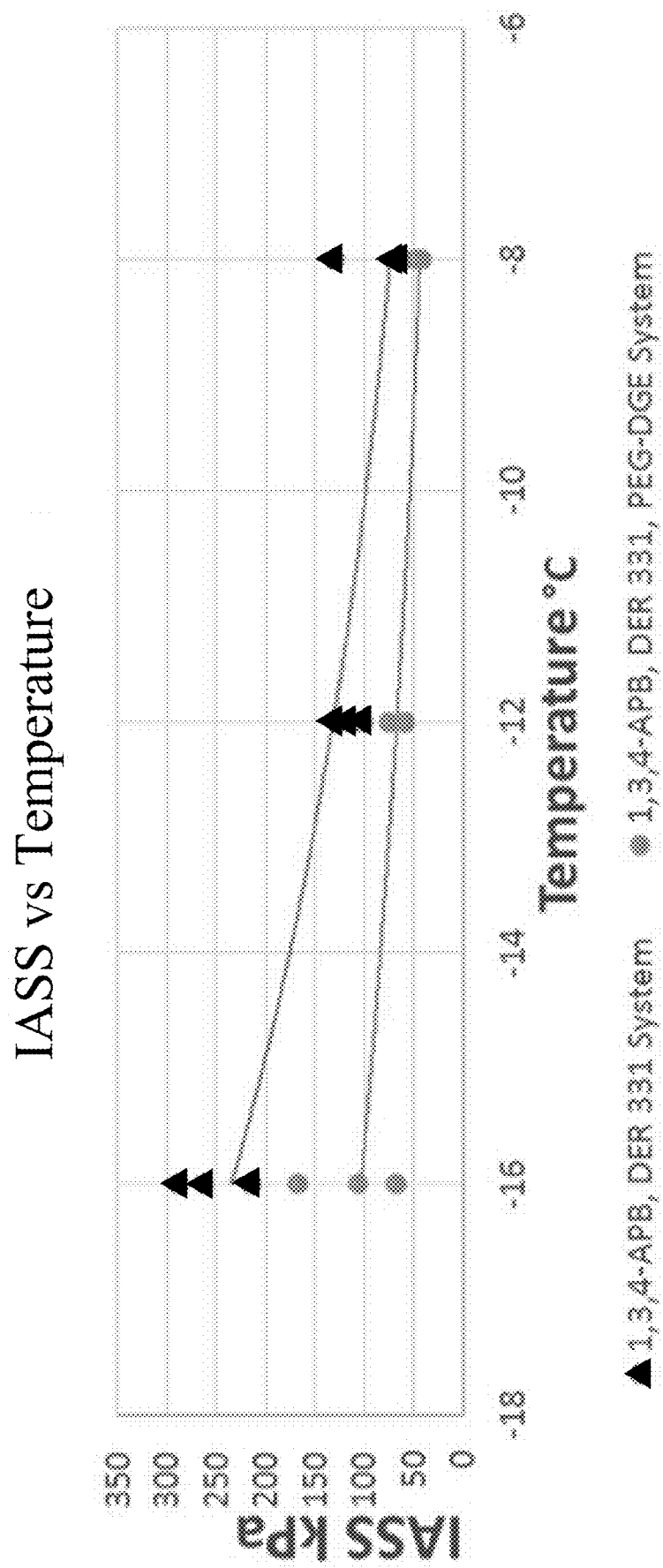
FIG. 12 is an illustrative chart showing properties of results of base coating testing according to aspects of the disclosure.

FIG. 12 is an illustrative chart showing properties of results of base coating testing according to aspects of the disclosure. For testing, and as a control, a plurality of test blanks and/or test rotors were prepared with a base coating comprising 1,3,4-APB and DER™ 331 were prepared and subjected to wear testing and ice adhesion testing. Additionally, a plurality of test blanks comprising 1,3,4-APB, DER™ 331, and PEG-DGE were prepared and subject to wear testing and ice adhesion testing. Based on the wear testing, the control polymer coating of 1,3,4-APB and DER™ 331 was found to have a WI of 70.27, while the polymer coating of 1,3,4-APB, DER™ 331, and PEG-DGE was found to have a WI of 136.53. Further, as can be seen in the chart shown in FIG. 12, the polymer comprising 1,3,4-APB, DER™ 331, and PEG-DGE was found to have higher icephobic properties (e.g., decrease in determined IASS by approximately 50.7%) as compared to the control polymer comprising only 1,3,4-APB and DER™ 331. However, while the inclusion of PEG-DGE was found to improve IASS, the durability of the PEG-DGE polymer coating significantly reduced the durability (as measured by the WI) by 94.3% with respect to the control polymer comprising 1,3,4-APB and DER™ 331.

As a solution, additional additives were investigated to be added to the PEG-DGE inclusive polymer to increase the durability of the coatings, while still maintaining the icephobic properties that glycol groups provided by the tested diglycidyl ether. For example, epoxy coatings comprising 1,3,4-APB and DER™ 331 and about 35% PEG-DGE were created and tested with different percentages of additives, such as hG and core-shell rubber particles. In an illustrative test case, hG additive percentages of about 0.1%, about 0.25%, about 0.5%, and about 1%. In another illustrative test case, CSR particle concentrations were tested at percentages of about 1%, about 2%, about 5%, and about 10%.

Figure 13A:
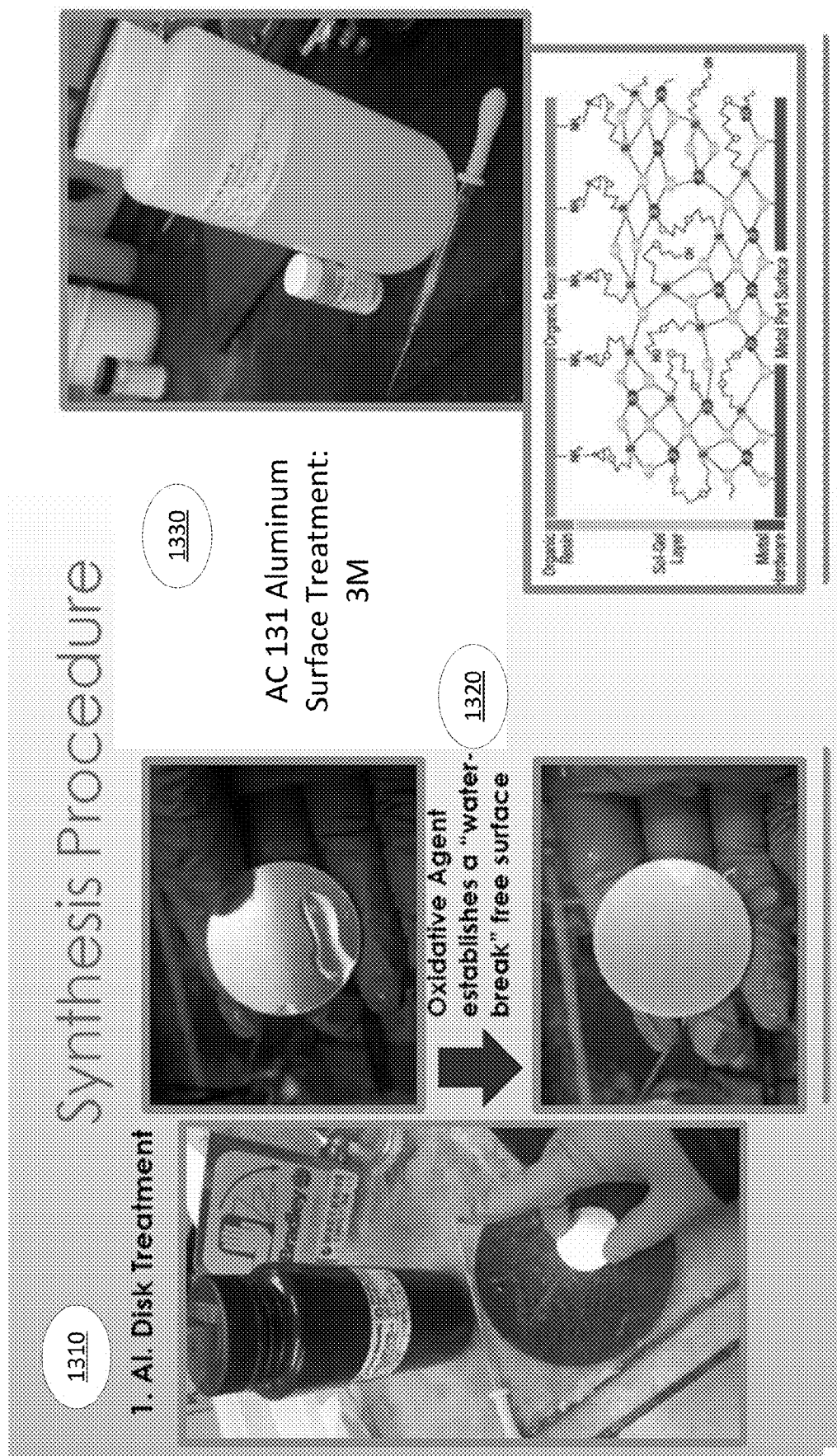
FIGS. 13A and 13 B are a depiction of an illustrative process creating coated test pieces according to aspects of the disclosure.
Figure 13B:
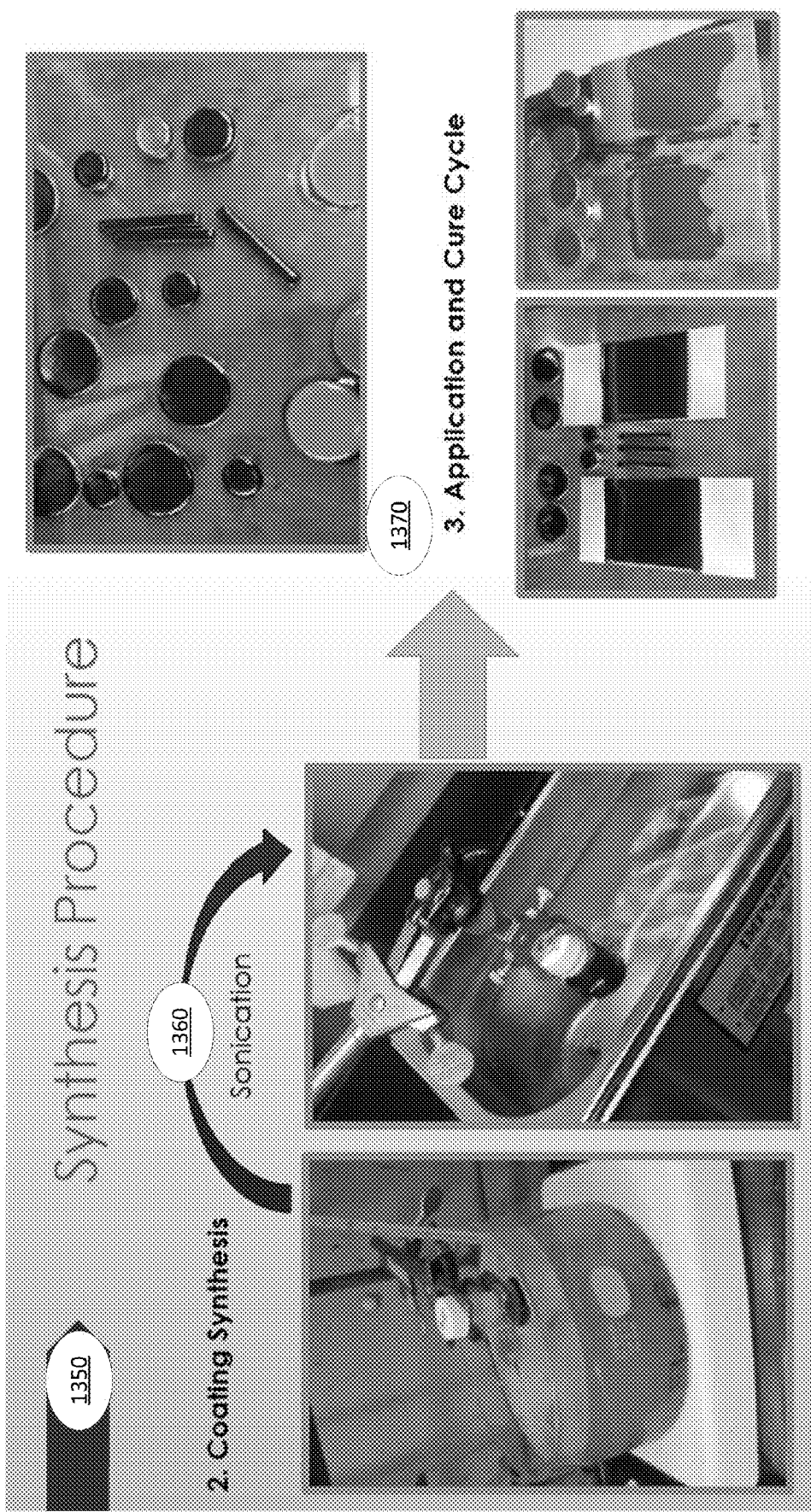

FIGS. 13A and 13B are a depiction of an illustrative process creating coated test pieces according to aspects of the disclosure. For example, the process of creating test pieces (e.g., test blanks for abrasion testing, test specimens for IASS testing, and the like) were created by first performing a surface treatment process 1310 of a surface of the metal blank, such as by using an oxidative agent to establish a "water-break" free surface at 1320 and then applying a commercially available surface treatment formulated for the metal comprising the substrate of the test blank at 1330. For example, an AC131 aluminum surface treatment from 3M was applied to the surface to each test blank. Following the surface treatment of each test blank, a coating process 1350 was performed to apply the desired polymer coating for testing purposes. First, a sonication process was performed at 1360 on each polymer mixture for testing to ensure even dispersal of additives within the polymer mixture. At 1370, a plurality of test blanks was coated for each desired mixture concentration and for each additive and allowed to cure.

Figure 14:
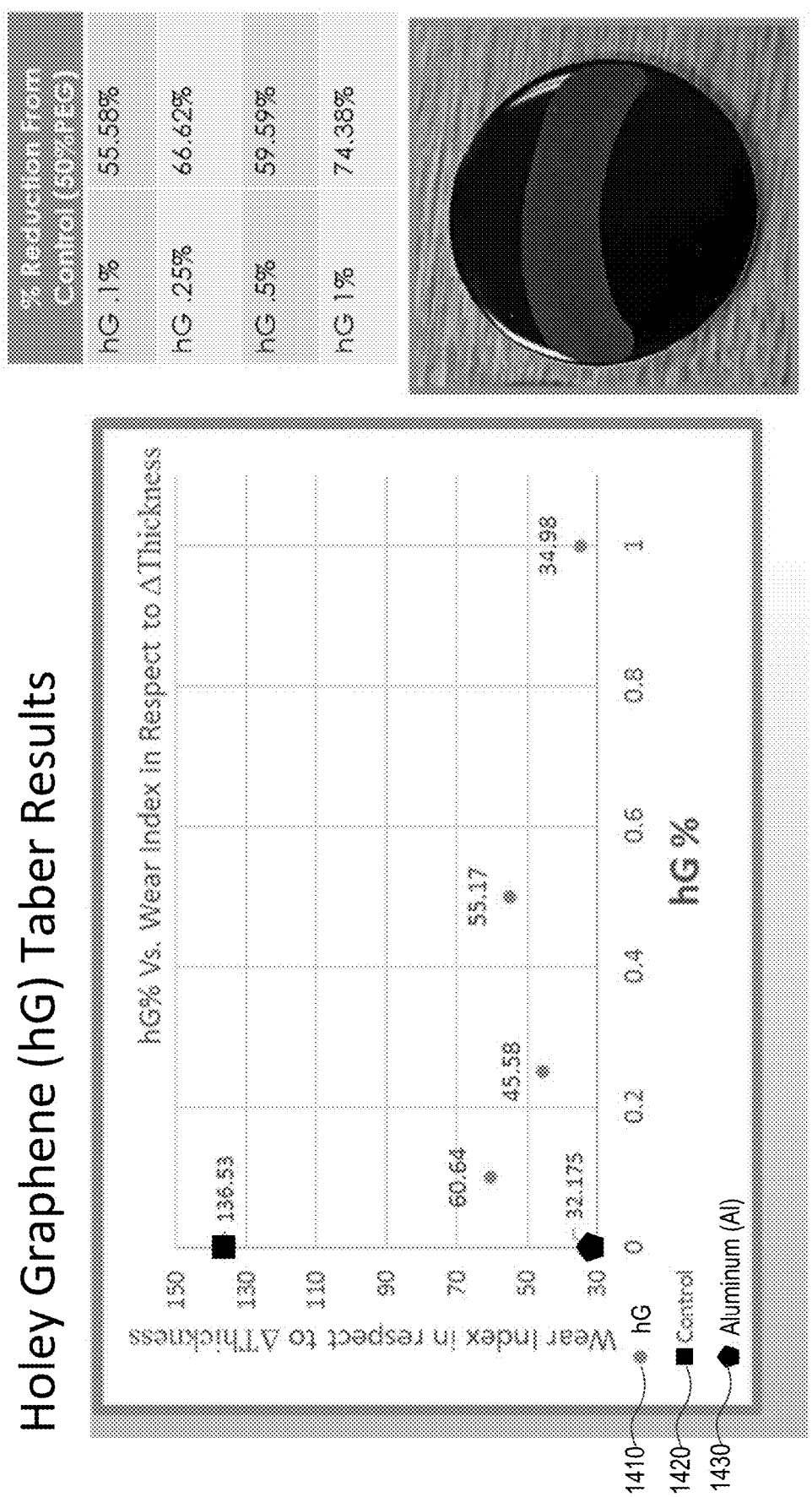
FIG. 14 shows illustrative abrasion testing results according to aspects of the disclosure.

FIG. 14 shows illustrative abrasion testing results of different concentrations of hG additive containing coatings 1410, a control base polymer coating 1420, and an uncoated aluminum (Al) blank 1430. As can be seen, the addition of hG in all tested concentrations, provided a reduction of the WI from about 56% (e.g., about 0.1% concentration of hG) to about 74% (e.g., about 1% concentration of hG) from the control WI.

Figure 15:
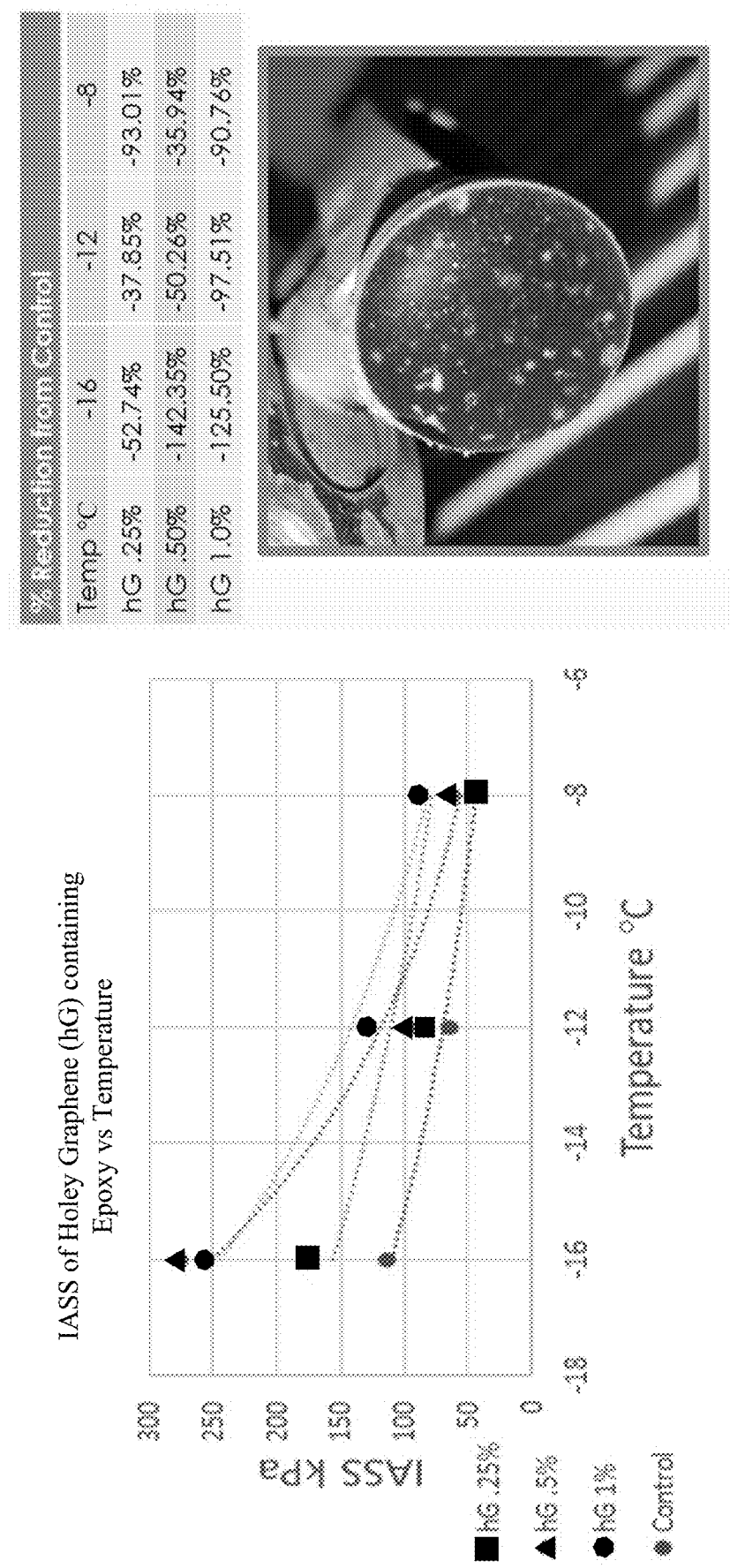
FIG. 15 shows illustrative ice adhesion shear strength (IASS) testing results according to aspects of the disclosure.

FIG. 15 shows illustrative IASS testing results for different concentrations of hG additive containing coatings as compared to a control base polymer coating at different temperatures that may be experienced, such as by an aircraft at an altitude while in-flight. Based on the testing results, an inclusion of hG was found to increase IASS relative to the control. For example, the graph shows an increase (e.g., a reduction from control shown by negative %) in IASS at −16° C. for different concentrations of hG. For example, about a −53% change was seen for a 0.25% concentration of hG and about a −126% change was seen for a 1.0% concentration of hG. At −12° C. a change of about −38% was observed for a 0.25% concentration of hG and a change of about −98% was seen for a 1.0% concentration of hG. Additionally, at −8° C. a change from about −36% for a 0.5% concentration of hG and a reduction of about −93% was seen for a 0.25% concentration of hG.

Figure 16:
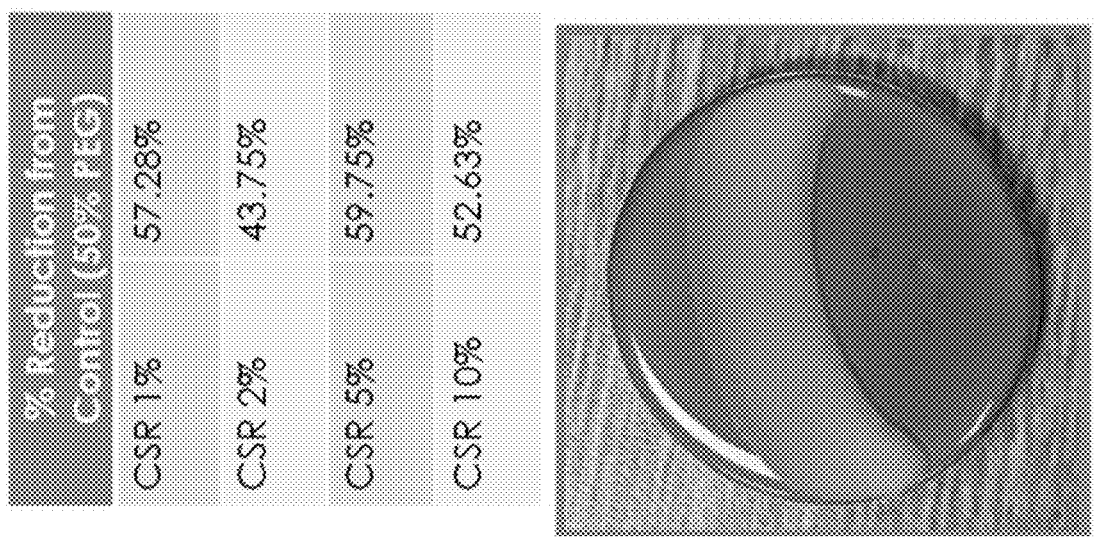
FIG. 16 shows illustrative abrasion testing results according to aspects of the disclosure.
Figure 16:
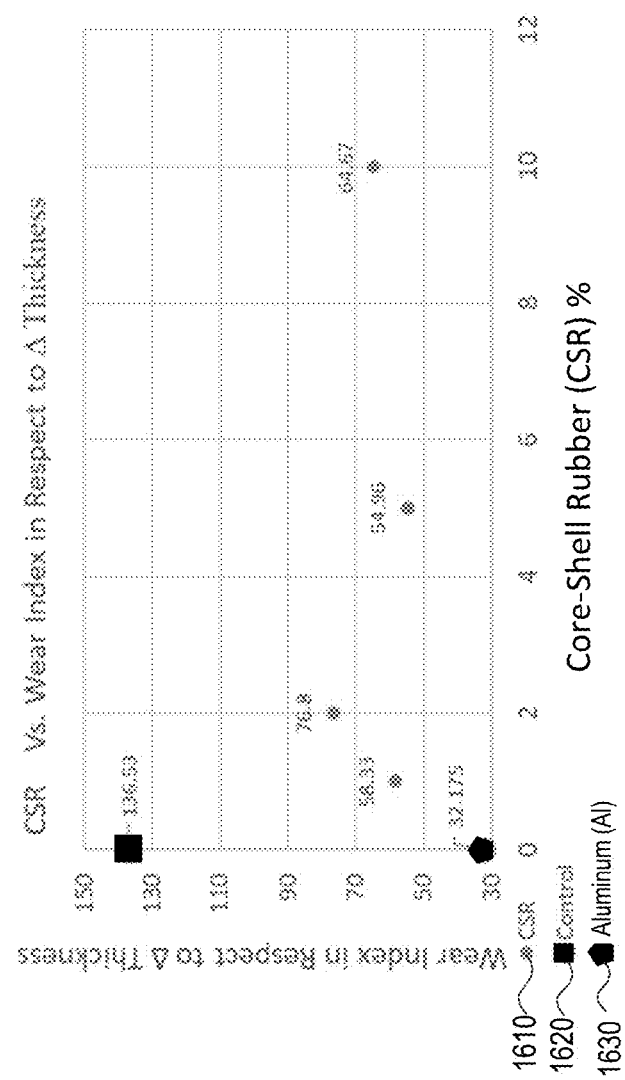

FIG. 16 shows illustrative abrasion testing results of different concentrations of CSR additive containing coatings 1610, a control base polymer coating 1620, and an uncoated aluminum (Al) blank 1630. As can be seen, the addition of CSR in all tested concentrations, provided a reduction of the WI from about 44% (e.g., about 2% concentration of CSR) to about 60% (e.g., about 5% concentration of CSR) from the control WI.

Figure 17:
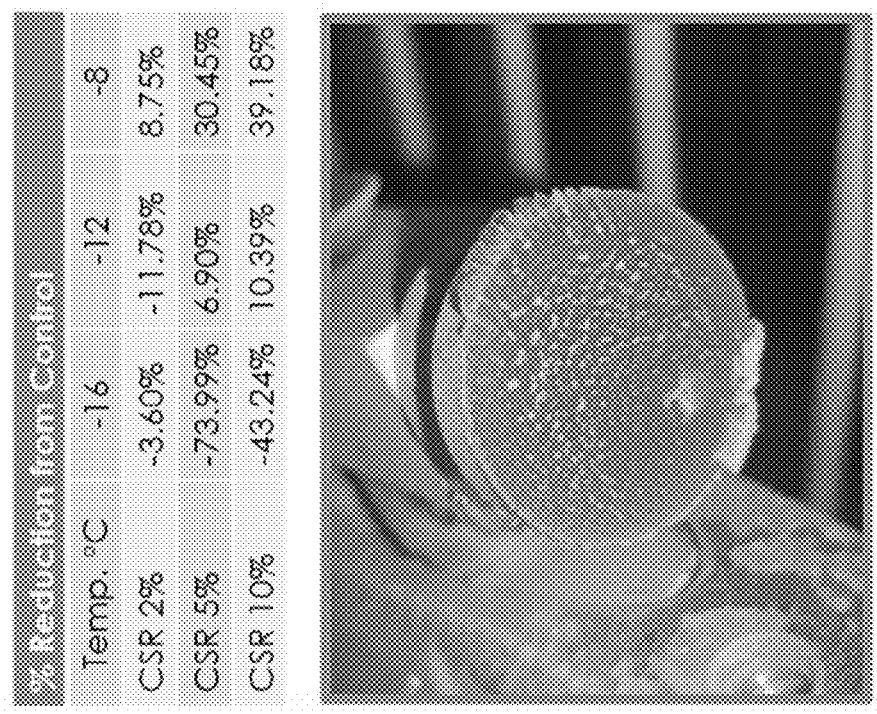
FIG. 17 shows illustrative IASS testing results according to aspects of the disclosure.
Figure 17:
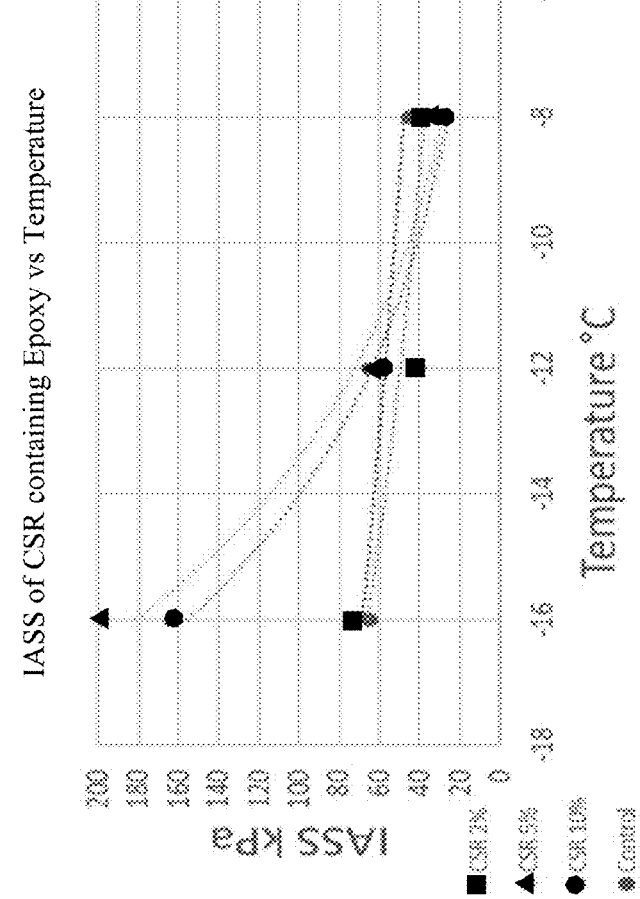

FIG. 17 shows illustrative IASS testing results for different concentrations of CSR additive containing coatings as compared to a control base polymer coating at different temperatures that may be experienced, such as by an aircraft at an altitude. Based on the testing results, an inclusion of CSR was found to increase IASS (e.g., negative %) relative to the control in some cases, but was found to reduce IASS (e.g., positive %) in several others. For example, the graph shows an increase in IASS of about −4% at −16° C. for a 2% concentration of CSR and an increase of about −74% was seen for a 5% concentration of CSR at the same temperature. At −12° C., an increase was found to be about −12% with a 2% concentration of CSR and a 10% reduction was seen for a 10% concentration of CSR. At −8° C., a reduction of about 9% was seen for a 2% concentration of CSR and a reduction of about 39% was seen for a 10% concentration of CSR.

FIG. 18 is an illustrative block diagram of a testing blank coated with a base polymer coating with a mixed composition of additives of both CSR particles and hG additives, according to aspects of this disclosure. Based on the above noted experimental results, combinations of CSR and hG additives may be used to increase a desired performance of the combined polymer coating, such as based on desired parameters. For example, to provide a polymer coating with the lowest IASS, a combination of about 10% CSR and 0.5% hG may be used. To provide a more durable polymer coating (e.g., a coating with the lowest WI) a combination of about 5% CSR and 1% hG may be used. Additionally, to provide a coating that optimizes both the WI and the IASS characteristics of the coating, a combination of about 7.5% CSR and 0.75% hG may be used. While experimental results show such results with a specific combination of a diamine, a bisphenol-A based epoxy, a diglycidyl ether, such as with a 35% ratio of PEG-DGE, other concentrations of PEG-DGE may be contemplated such as within a range from about 10% to about 30%.

Based on experimental results, hG at 1% wt. loading may increase durability by about 74.38%, but the 1% wt. loading may increase IASS by as much 125.5% with respect to the control base coating. A CSR particle at a 10% wt. loading may increase durability by about 52.63% and may decrease IASS by 39.18% at −8° C. However, IASS increases by 43.24% at −16° C. A notable result is that all coatings including either hG or CSR particles increase durability at least by 40%.

In Sojoudi, H. (2015) Durable and scalable icephobic surfaces: similarities and distinctions from superhydrophobic surfaces. Soft Matter, 2016(12), 1938-1963, ideal passive icephobic coating properties were compared with ideal in-flight icephobic coating properties. While both the ideal passive properties and in-flight properties share the smooth and uniform surface characteristics and a stable repulsion mechanism with water and ice, Sojoudi noted that for ideal passive icephobic coating properties, a binder has molecular flexibility and aliphatic functionality. However, for ideal in-flight icephobic coating properties, with respect to durability, the binder may have molecular rigidity aromatic functionality, and may include additives. To solve such discrepancies, an investigation regarding functionalized POSS nanomaterials for reduction of impact ice adhesion and improving abrasion resistance of aircraft leading edge coatings was performed.

Figure 19:
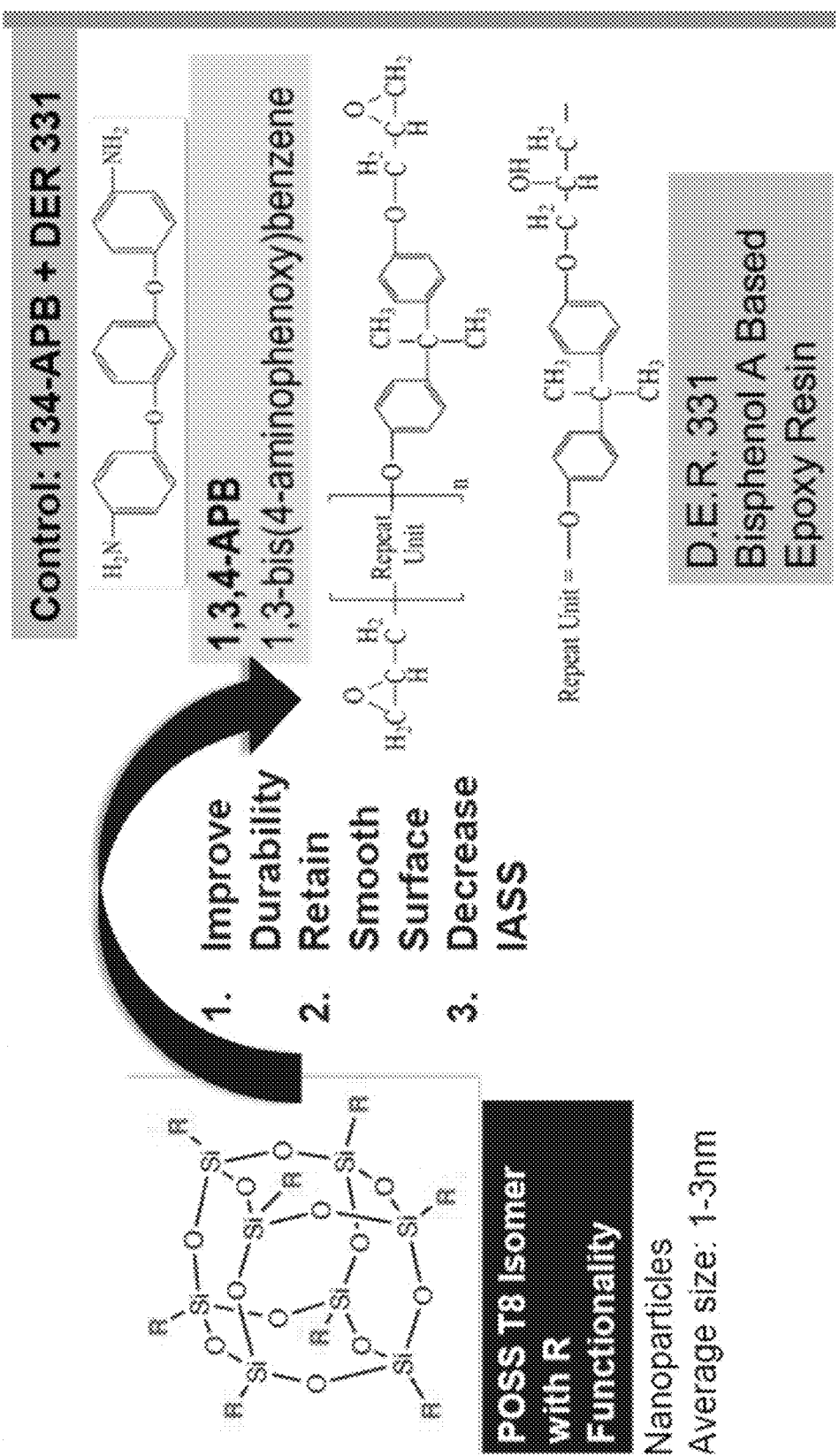
FIG. 19 shows an illustrative combination of functionalized POSS with epoxy according to aspects of the disclosure.

FIG. 19 shows illustrative combinations of functionalized POSS with different additives according to aspects of the disclosure. For example, a POSS isomer, comprising nanoparticles with an average size of about 1-3 nanometers, were combined with a control formulation (e.g., a combination of 1,3,4-APB and DER™ 331). Other formulations may also be contemplated, such as 1,3,4-APB, DER™ 331, and PEG-DGE. Such combinations were tested to investigate whether one or more additives may improve durability, retain a smooth surface and/or decrease IASS.

Figure 20B:
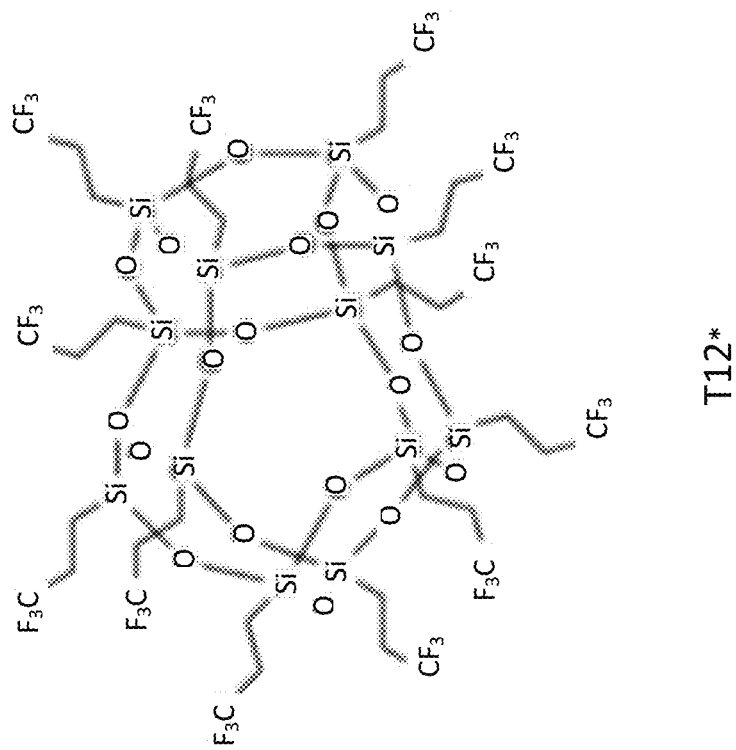
FIGS. 20A-C show illustrative structures of different POSS structures as tested according to aspects of the disclosure.
Figure 20A:
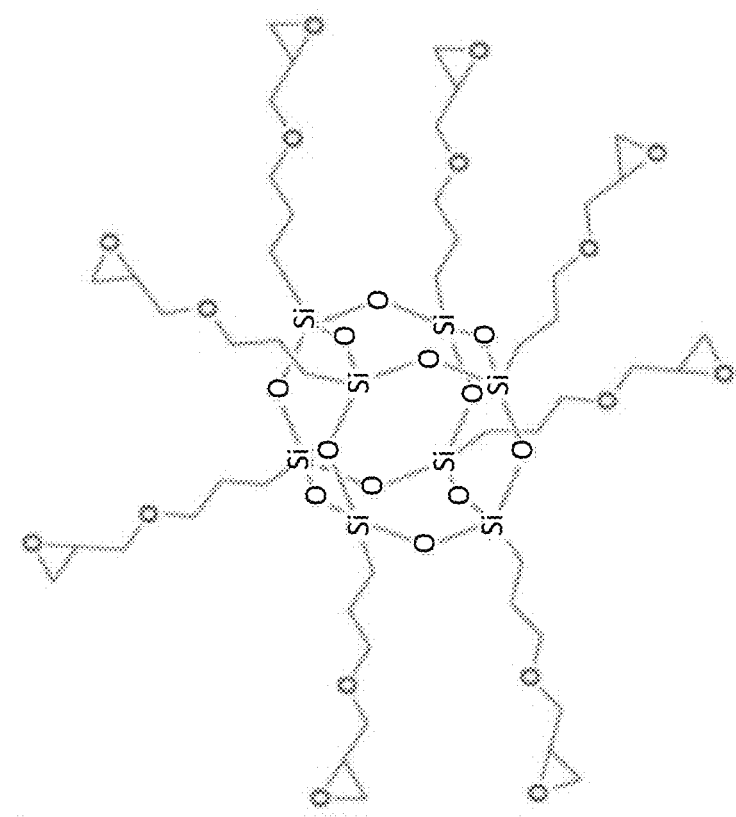
Figure 20D:
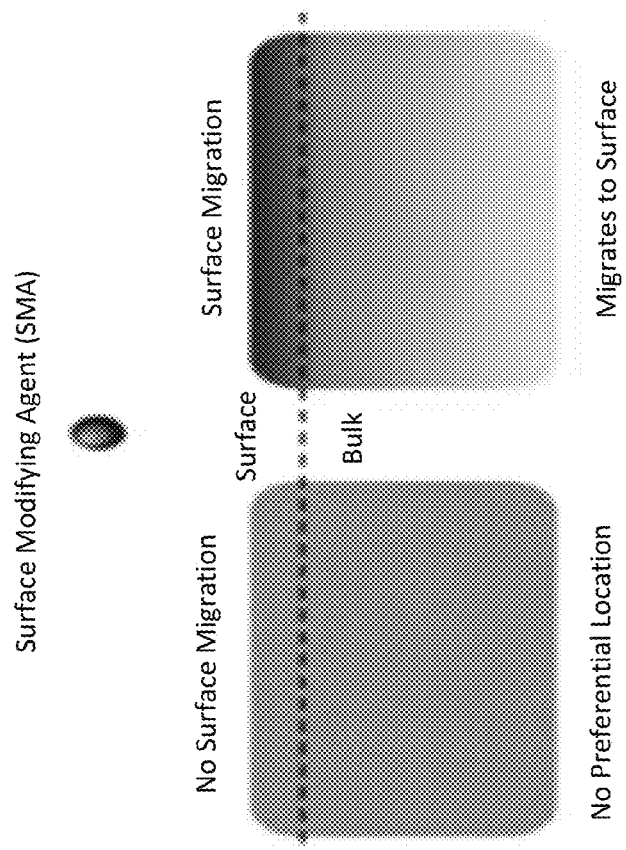
FIG. 20D shows an illustration of surface migration of Isooctyl and Trifluorpropyl POSS according to aspects of the disclosure.
Figure 20C:
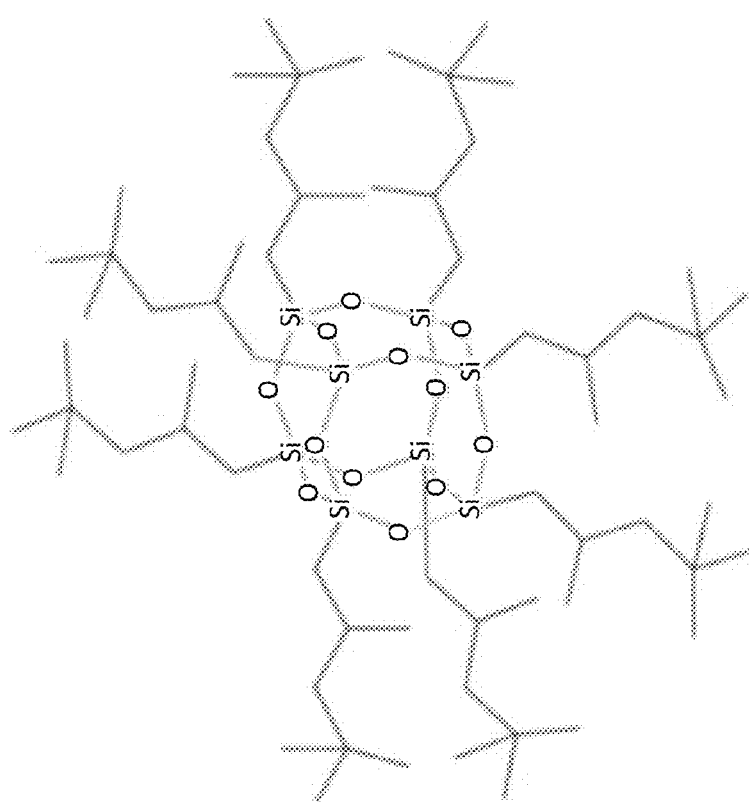

FIG. 20A-C show illustrative structures of different POSS structures as tested according to aspects of the disclosure. For example, FIG. 20A shows a structure of Glycidyl POSS (G-POSS), FIG. 20B shows a structure of Trifluoropropyl POSS (T-POSS), and FIG. 20C shows a structure of Isooctyl POSS (I-POSS). Other POSS structures may be contemplated. FIG. 20D depicts the surface migration of the I-POSS and T-POSS. No surface migration would be observed with G-POSS. For example, FIG. 20D shows possible results of use of a surface modifying agent (SMA), which may cause or encourage migration of a coating component to a surface. For example, I-POSS is a hybrid molecule with an inorganic silsesquioxane at the core and organic isooctyl groups attached at the corners of the cage. This rigid core acts like molecular ball bearing providing high film strength to reduce friction and wear. I-POSS is very stable even at high loadings and temperatures. It is also useful in thermoplastics reinforcement and as a porogen in biominimetic materials. In some cases, T-POSS may be used for the reduction of surface energy of a substance, and G-POSS is a hybrid molecule with an inorganic silsesquioxane at the core and organic glycidyl groups attached at the corners of the cage. G-POSS serves as a high temperature reactive diluent in both aromatic and aliphatic epoxy resin and will increase rubbery plateau modulus. POSS molecules also have robust resistance to environmental degradation such as moisture, oxidation, corrosion and UV radiation. G-POSS is also excellent at dispersing silica particles.

Figure 21:
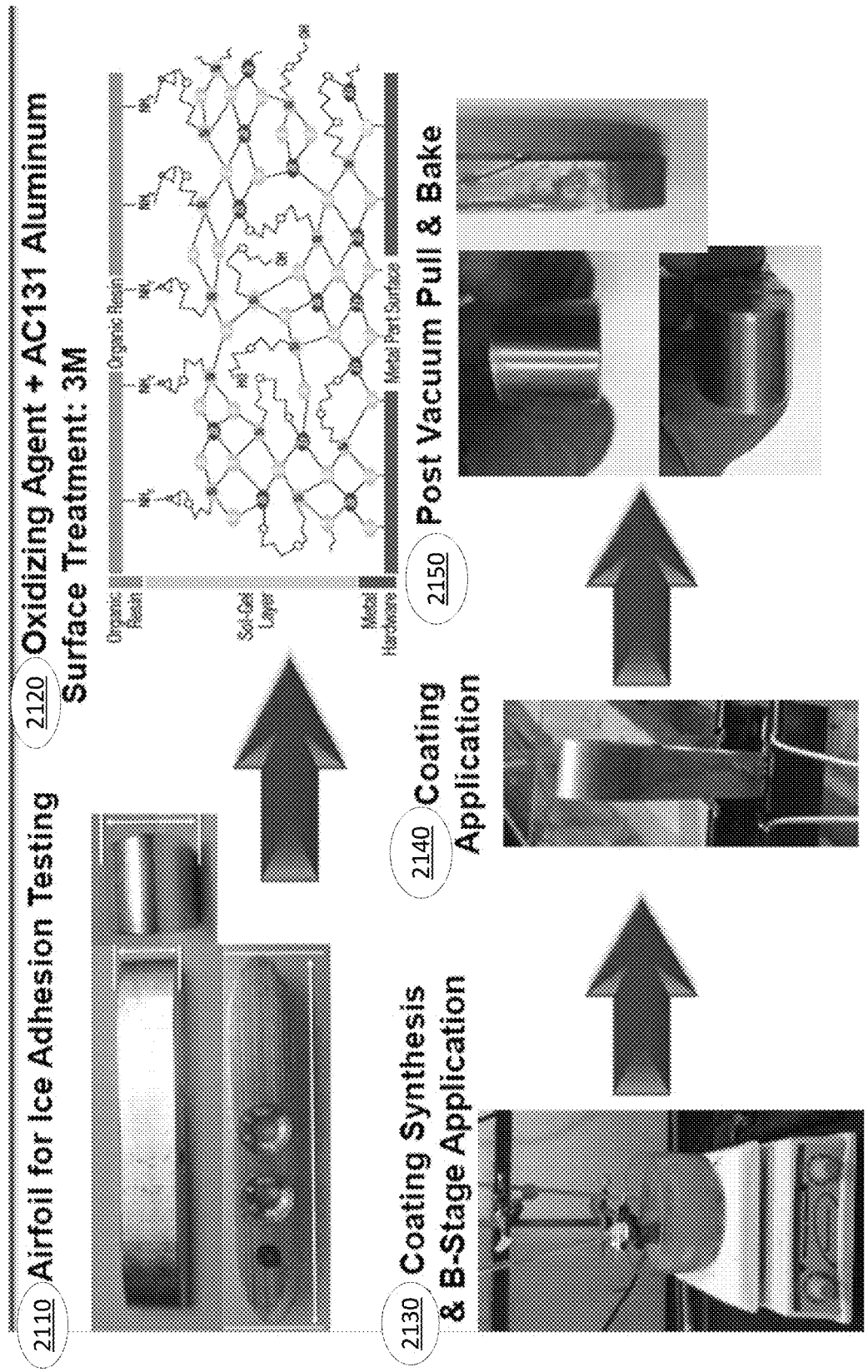
FIG. 21 is an illustrative flow diagram for coating and fabrication or articles for IASS testing according to aspects of the disclosure.

FIG. 21 shows an illustrative flow diagram for coating and fabrication or articles for testing according to aspects of the disclosure. For example, at 2110 an airfoil is prepared for ice adhesion testing, and undergoes a surface treatment at 2120 using one or more of an oxidizing agent and a commercially available surface treatment (e.g., AC131 Aluminum Surface Treatment provided by 3M). At 2130, the epoxy coating may be synthesized and heat cured, such as in a B-stage procedure such that the epoxy coating has been heat cured for a short time and cooled to prevent complete polymerization of the resin system. At 2140, the coating may be applied to the treated surface of the test piece and at 2150, the coated test piece is made ready for testing following a vacuum pull and bake procedure.

Figure 22:
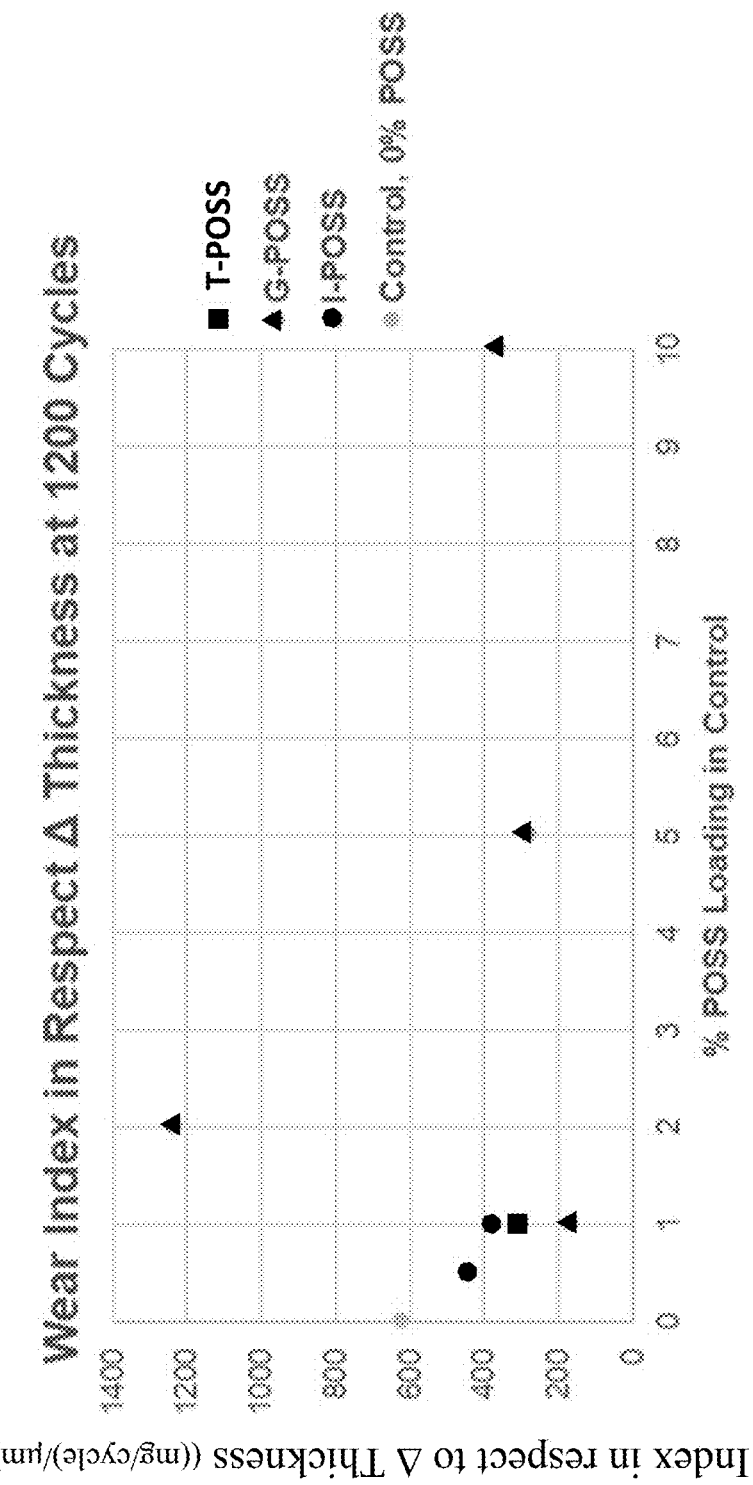
FIGS. 22 and 23 are charts illustrating abrasion test results according to aspects of the disclosure.

FIG. 22 is a chart illustrating abrasion test results according to aspects of the disclosure. As discussed above, the epoxy resin formulations may undergo abrasion testing (e.g., Taber abrasion testing) to determine a WI for different percentages of additives. Here, the abrasion tests may be performed using an abrasive wheel (e.g., a ceramic H18 wheel) for between about 1200 test cycles and 2400 test cycles. FIG. 22 shows a WI with respect to a change of thickness at 1200 test cycles for epoxy coatings having certain percentages of POSS additives, such as a control with no POSS additives, T-POSS (e.g., at about a 1% loading concentration), G-POSS (e.g., at about a 1%, at about a 5%, and at about a 10% loading concentration), and I-POSS (e.g., at about a 0.5% loading concentration, and at about a 1% loading concentration). In the illustrative tests, two samples were run per coating. In the illustrative example, the control had a WI of a little over 600 ((mg/cycle)/μm), a coating including G-POSS had a WI from about 190 at about a 1% G-POSS concentration and about 1225 at a 2% G-POSS concentration, a coating including T-POSS had a WI of about 300 at about a 1% T-POSS concentration, and a coating including I-POSS had a WI from about 430 at a 0.5% concentration and about 390 at a 1% concentration.

Figure 23:
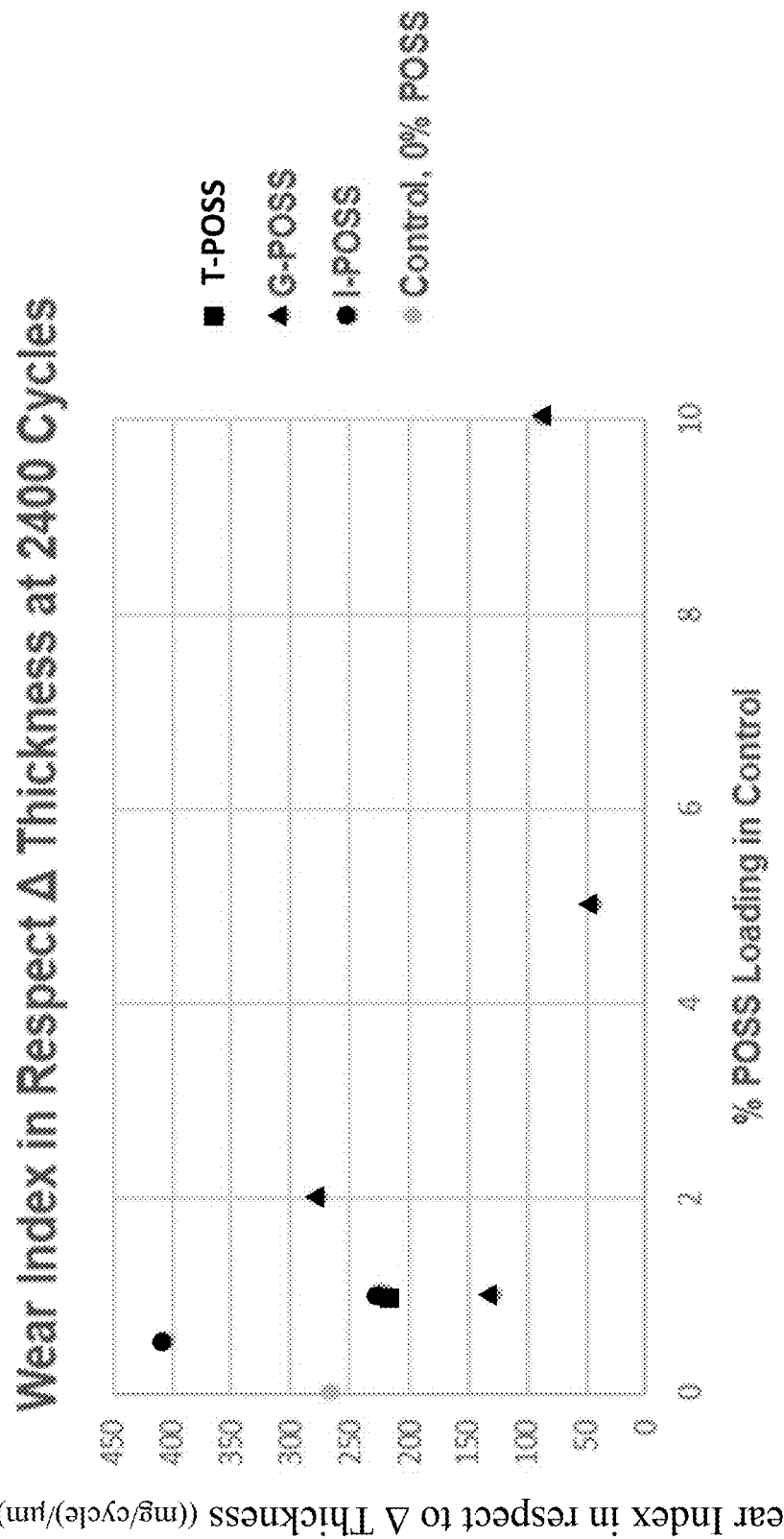

FIG. 23 is a chart showing a WI with respect to a change of thickness at 2400 test cycles for epoxy coatings having certain percentages of POSS additives, such as a control with a no POSS additives, T-POSS (e.g., at about a 1% loading concentration), G-POSS (e.g., at about a 1%, about a 2% concentration, about a 5%, and at about a 10% loading concentration), and I-POSS (e.g., at about a 0.5% loading concentration, and at about a 1% loading concentration). In the illustrative tests, two samples were run per coating. In the illustrative example, the control had a WI of about 260 ((mg/cycle)/μm), a coating including G-POSS had a WI from about 49 at about a 5% G-POSS concentration and about 275 at a 2% G-POSS concentration, a coating including T-POSS had a WI of about 210 at about a 1% T-POSS concentration, and a coating including I-POSS had a WI from about 410 at a 0.5% concentration and about 230 at a 1% concentration.

In some cases, a commercially available icephobic coating was tested (e.g., Wearlon®) at 100 cycles and compared to abrasion results from tests of an epoxy resin comprising 1% T-POSS and tested at 2400 cycles. In the tests, the commercially available coating at 80 cycles had an average thickness of 30 µm as compared to the thinnest tested coating at 2400 cycles for the noted 1% T-POSS containing epoxy, where the average thickness was 220 µm. As can be seen, the POSS based coatings and control were more durable than the commercially available coating by about 90%.

Figure 24:
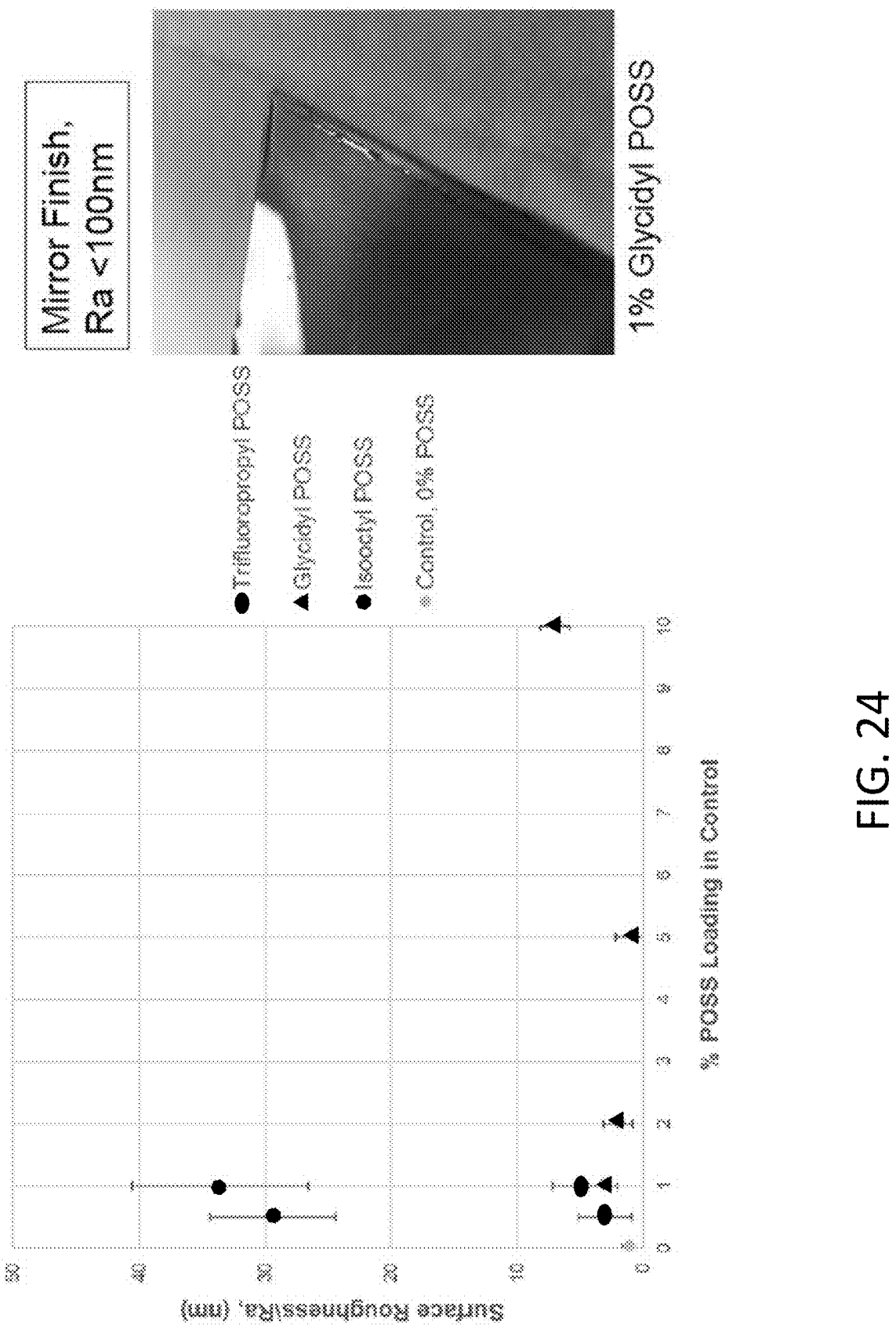
FIG. 24 shows a chart illustrating a change in surface roughness (Ra) for epoxy resins containing POSS additives according to aspects of the disclosure.

FIG. 24 shows a chart illustrating a change in surface roughness for epoxy resins containing POSS additives according to aspects of the disclosure. Roughness may be measured by determining profile height measurements of features on a surface of an object, such as by measuring surface peaks and surface valleys, such as with an optical measurement tool and/or a stylus-based measurement tool. An arithmetic average of the absolute values of the profile height deviations from the mean line (Ra) measured during an evaluation. Simply put, Ra is the average of a set of individual measurements of a surfaces peaks and valleys. In the illustrative chart, a control resin was found to have a roughness index of about 1, a T-POSS containing epoxy was found to have a surface roughness of about 3 at a 0.5% concentration and at about 5 with a 1% concentration, a G-POSS containing epoxy was found to have a surface roughness from about 1 at a 5% concentration to about 8 at a 10% concentration, and a I-POSS containing epoxy was found to have a surface roughness from about 29 at a 0.5% concentration to about 33 at a 1% concentration. Note that all tested epoxy formulations resulted in a surface roughness well under the threshold of having a "mirror-like" finish as defined by Ra being less than 100 nm.

Figure 25:
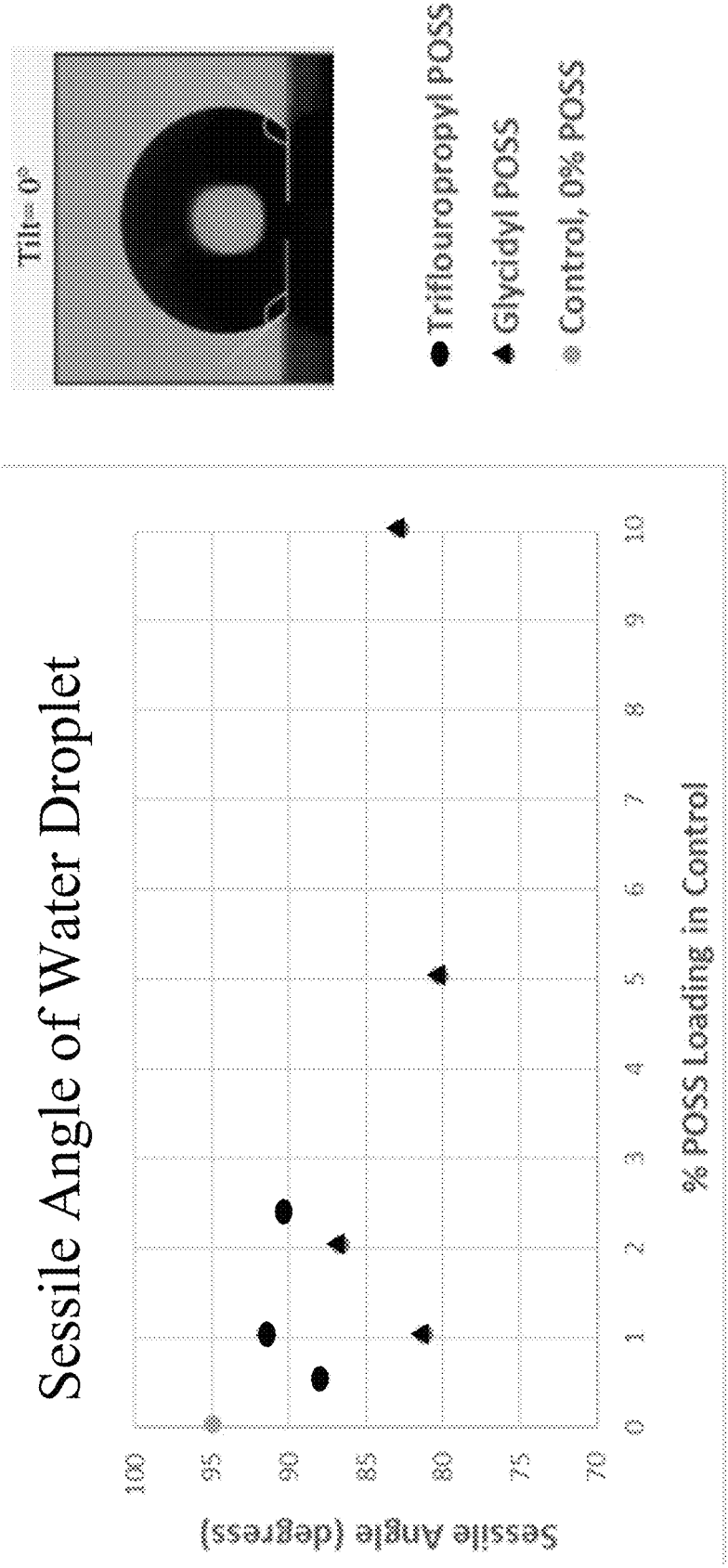
FIGS. 25 and 26 show charts illustrating test results to determine water droplet contact angles according to aspects of the disclosure.
Figure 26:
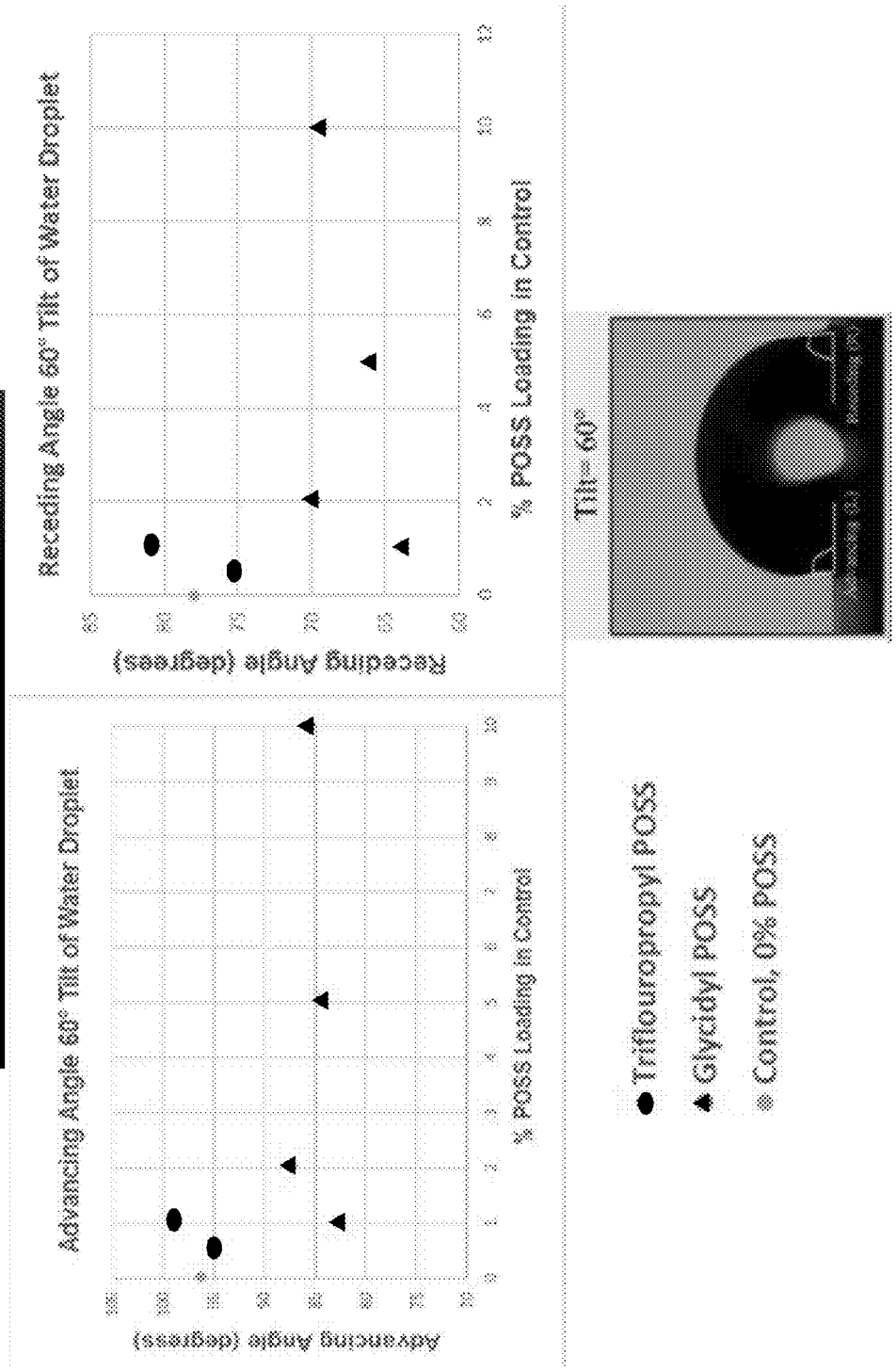

FIG. 25 shows a chart illustrating wetting test results to determine a sessile angle of a water droplet according to aspects of the disclosure, such as by use of a contact angle goniometer that facilitates a visual measurement of a contact angle. A sessile angle was determined for epoxy formulations including a control epoxy with the base formulation (e.g., 0% POSS and having a sessile angle of about 95 degrees), a T-POSS containing formulation (e.g., 1% T-POSS having a sessile angle of about 92 degrees, 2.5% T-POSS having a sessile angle of about 90 degrees), and a G-POSS containing formulation (e.g., 5% G-POSS having a sessile angle of about 80 degrees, 2% G-POSS having a sessile angle of about 87 degrees, etc.). FIG. 26 shows charts illustrating test results of a contact angle hysteresis test and showing results corresponding to an advancing angle (e.g., about 60 degrees) of a water droplet and a receding angle (e.g., about 60 degrees) of a water droplet for T-POSS containing epoxies, G-POSS containing epoxies and a control epoxy.

Figure 27:
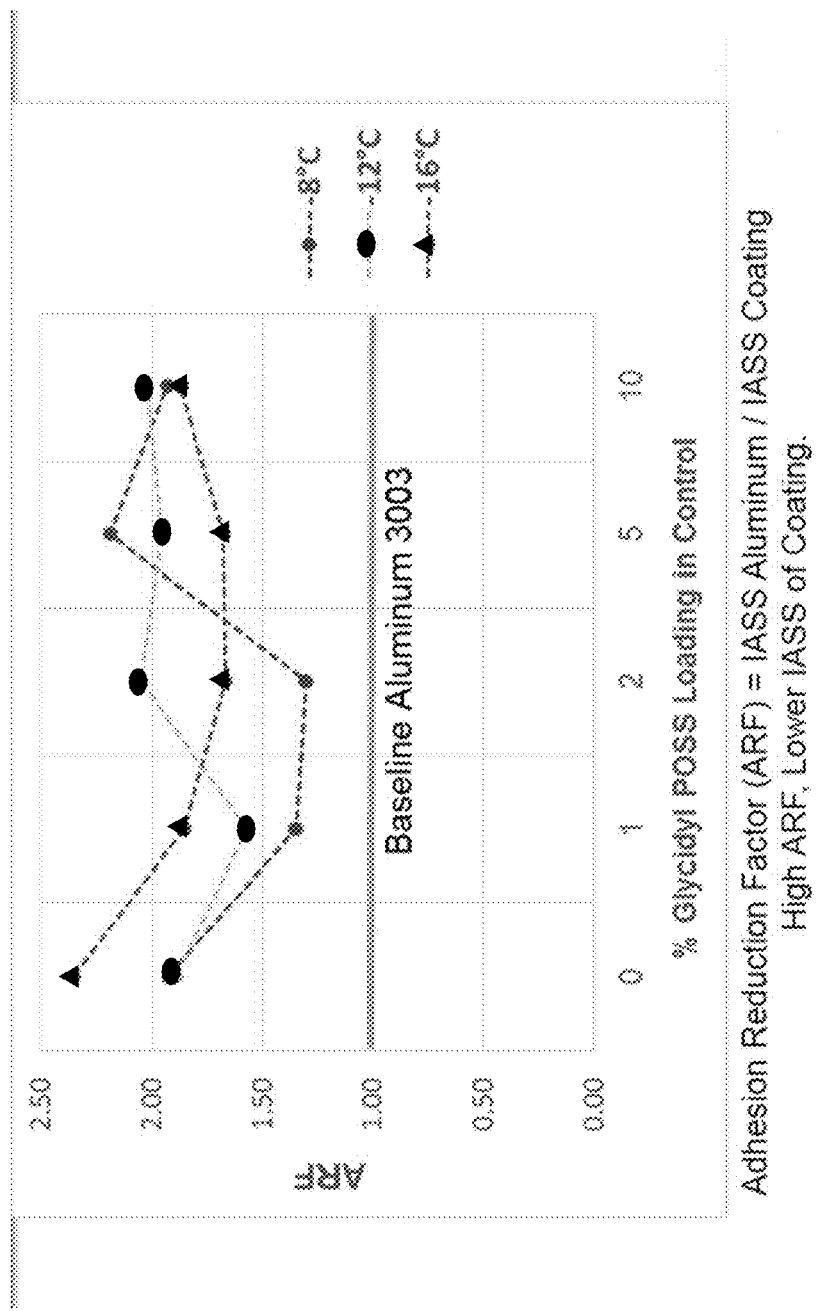
FIGS. 27-30 show illustrative test results from IASS tests according to aspects of the disclosure.
Figure 28:
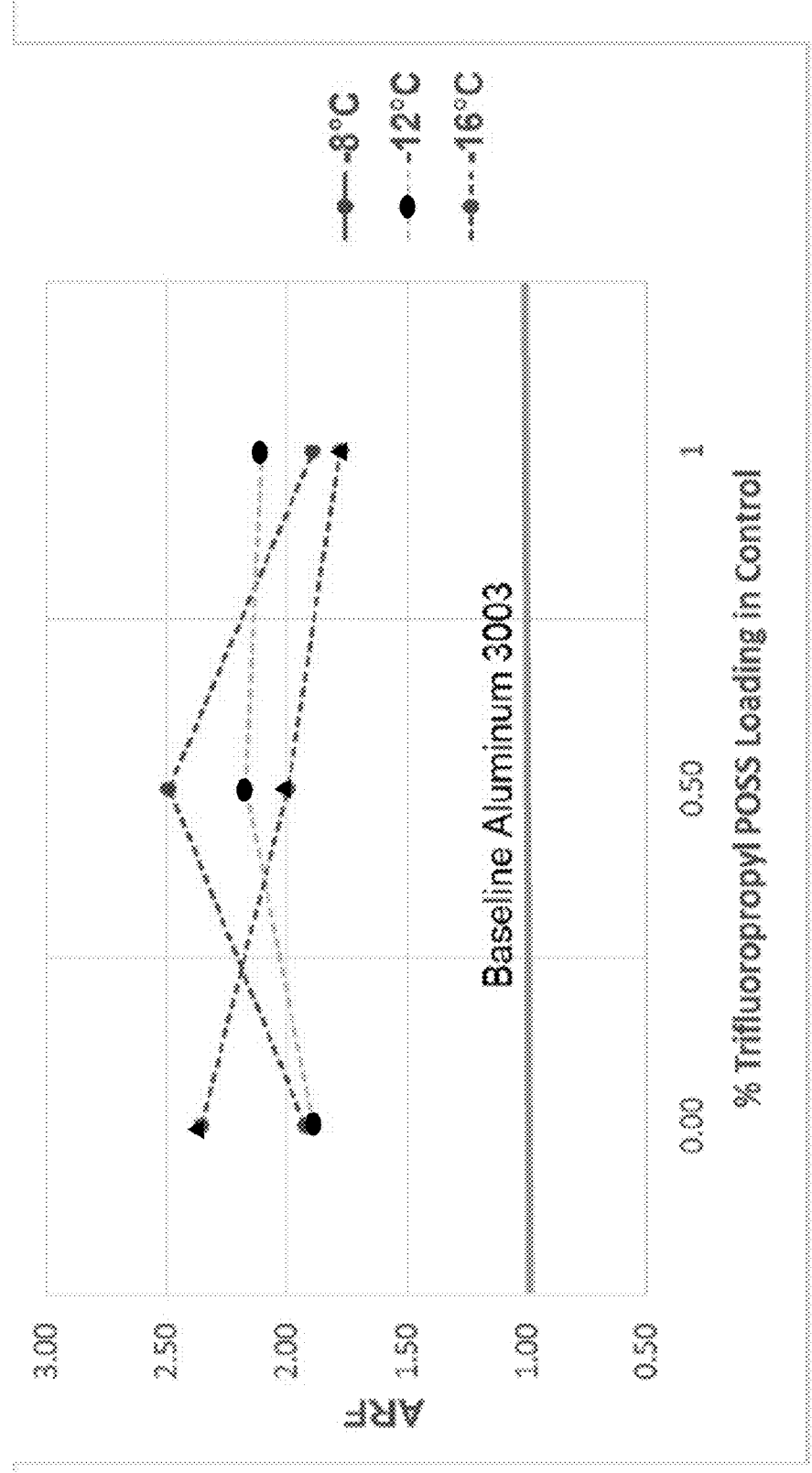
Figure 29:
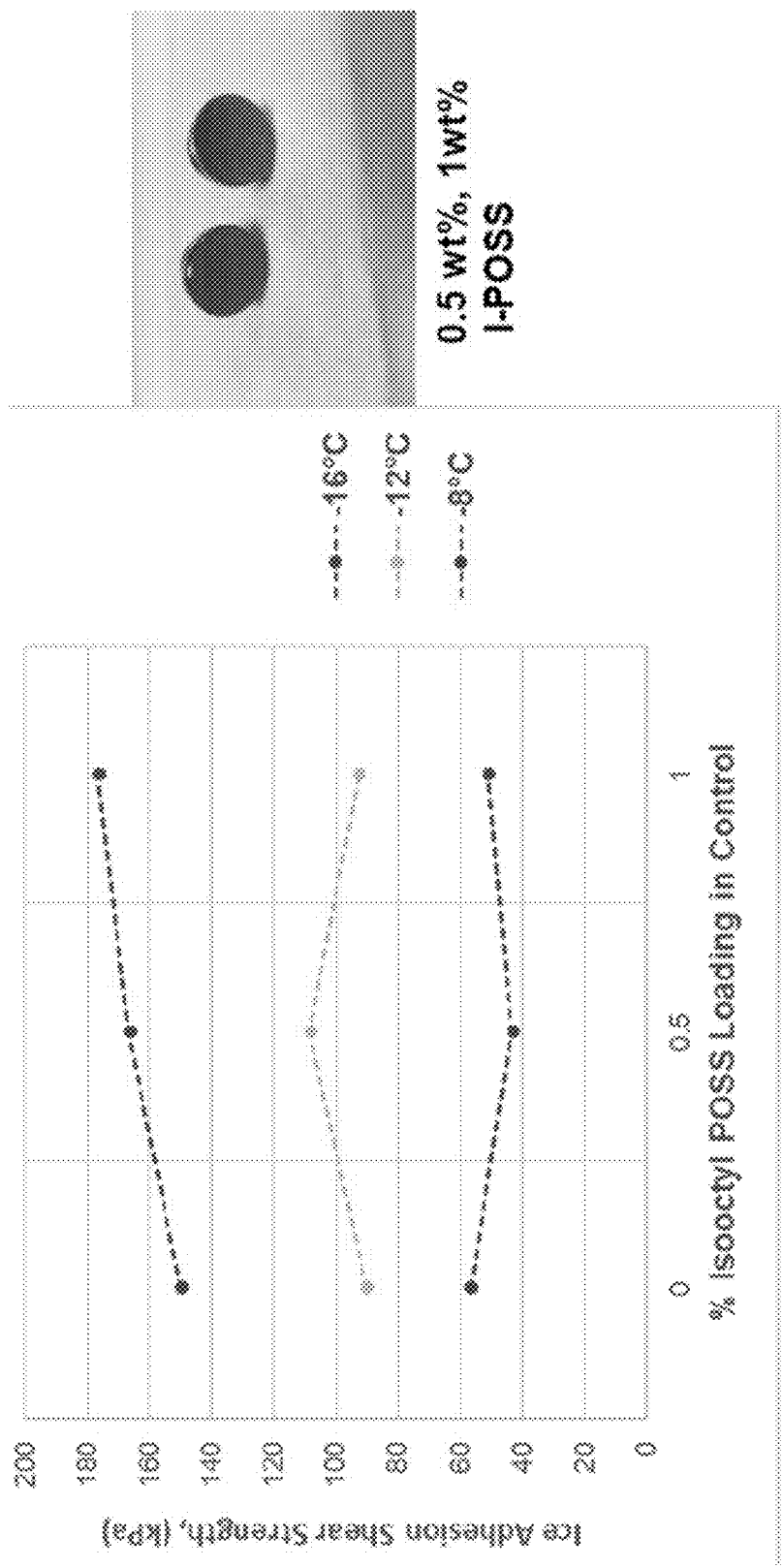
Figure 30:
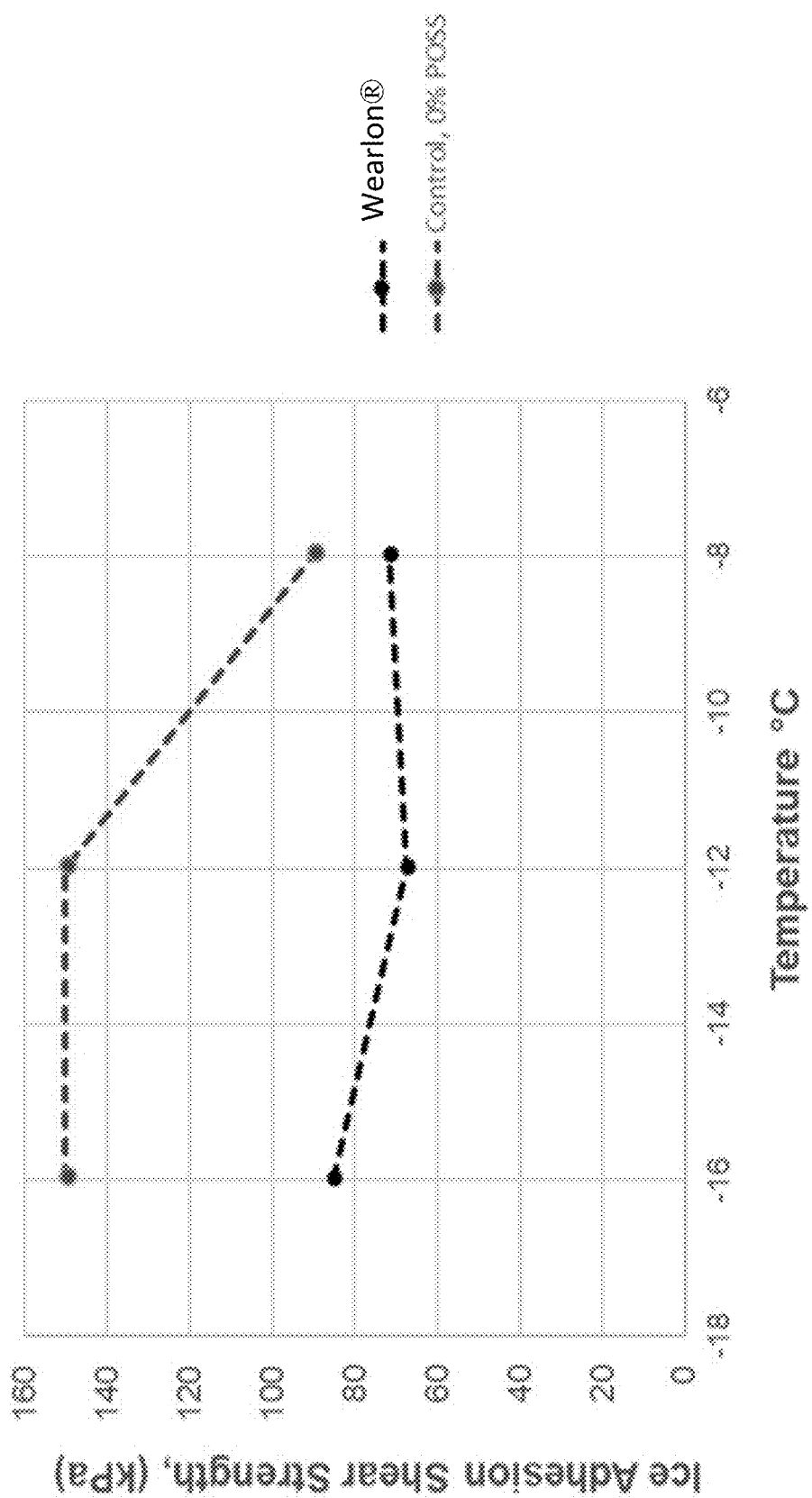

FIG. 27 shows a chart illustrating ice adhesion shear stress testing of a G-POSS epoxy coated airfoil. The chart shows the test results as an Adhesion Reduction factor (ARF), which is calculated by the IASS of aluminum divided by the IASS of the coating. A high ARF value corresponds with a lower IASS value of the coating. FIG. 28 shows a chart illustrating IASS testing of a T-POSS epoxy coated airfoil. FIG. 29 shows a chart illustrating IASS testing of a I-POSS epoxy coated puck and FIG. 30 shows a chart illustrating a comparison of IASS testing results of a Wearlon® coated puck and a control epoxy formulation (e.g., 0% POSS) coated puck.

In a summary of the overall experimental results, T-POSS and I-POSS were found to provide between about 5% to about 20% reduction of IASS at $-12°$ C. and $-8°$ C. Additionally, POSS nanomaterials have improved a durability of a control epoxy by up to 60% at 100 cycles and up to 80% at 2400 cycles. Further, all tested epoxy coatings, with and without additives, were found to be more durable than a commercially available coating, where a control epoxy (0% POSS) generates 10-50% higher IASS values at $-16°$ C., $-12°$ C., $-8°$ C.

The use of hG in the formulations provides two distinct, unique features. First, as a result of how the hG is generated, through controlled partial oxidation of defect-rich sites in graphene, there are a significant number of high energy functionalities on the perimeter of the holey graphene sheet. The presence of these high energy functionalities enables better dispersion in the resin formulation relative to a holey graphene sheet without these functionalities. Since the process generating the holes is specific to defect-rich sites, the desirable mechanical properties of the graphene are largely maintained. The good dispersion within the matrix provided by the functionality-enriched hG enables the mechanical properties of the graphene to be imparted into the formulation as a whole to a greater extent than would be possible with a poorly dispersed material. Second, as a result of the holes present in holey graphene, this reinforcing agent can be fully integrated into the epoxy resin, with resin flowing through the openings in the graphene sheet, further enabling translation of the mechanical properties of the graphene into the surrounding matrix.

CSR micro particles are often utilized as a toughening agent in epoxy matrices. What is unique to the inclusion of these particles in the described coating formulation is that the micro particles act as an impact force dissipation agent. Specifically, these particles impart a surface with a heterogeneous elastic modulus such that, upon impact of a high speed contaminant, regions of the surface would be depressed while other would retain their orientation. This would impart instability in the expanding liquid causing reduced adhesion with the impacted substrate. This compression would also work to dissipate the impact force further reducing available energy for adhesion.

The POSS species utilized in the formulations described here impart several unique features to these coatings. First, the hydrophobic functionalization present on POSS materials (aliphatic and fluorinated species) will preferentially surface migrate resulting in greater surface concentration than what would be present if this material were dispersed uniformly throughout the resin. These species would reduce adhesion interaction with the coating and may provide surface lubricity to improve abrasion resistance. The surface will also be mechanically reinforced as a result of the high density of POSS present. Hydrophilic POSS species consists of chemical functionalities that are known to act as freezing point suppressants. Also, the nature of these functionalities would enable these materials to be readily dispersed through the matrix and contribute to improving the mechanical durability of the coating overall.

The epoxy resin itself, having a combination of aromatic and aliphatic species provides a novel juxtaposition of rigidity for the purpose of providing a durable coating and flexibility to impart defects in ice crystals that form upon impact of super-cooled water droplets. Further, the flexible aliphatic portions may also provide surface lubricity for improved abrasion resistance. Further, inclusion of polyethylene glycol with glycidyl ether (epoxide ring) functionalities may further work to suppress the freezing point of supercooled water droplets and may impart defects in forming ice crystals. Both of these interactions would reduce ice adhesion strength.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. An epoxy resin comprising a diamine, a bisphenol-A based epoxy, isooctyl polyhedral oligomeric silsesquioxane in an amount of at least 0.5 percent by weight of the epoxy resin, a holey graphene, and core-shell rubber particles.

2. The epoxy resin of claim 1, further comprising a diglycidyl, wherein the diamine comprises 1,3-Bis(4-aminophenoxy)benzene and the diglycidyl comprises Poly(ethylene glycol) diglycidyl ether.

3. The epoxy resin of claim 1, wherein the epoxy resin comprises between 0.5 percent and 1 percent of isooctyl polyhedral oligomeric silsesquioxane.

4. The epoxy resin of claim 1, having a wear index of at least 190 after 1200 wear cycles.

5. The epoxy resin of claim 1, wherein the epoxy resin comprises between 0.75 percent and 1 percent of the holey graphene and between 5 percent and 10 percent of the core-shell rubber particles.

6. The epoxy resin of claim 1, wherein the holey graphene and the core-shell rubber particles are each micro-sized particles.

7. The epoxy resin of claim 1, wherein the bisphenol-A based epoxy comprises a diglycidyl ether.

8. The epoxy resin of claim 7, further comprising poly (ethylene glycol) diglycidyl ether.

9. The epoxy resin of claim 1, wherein the diamine comprises 1,3-bis(4-aminophenoxy)benzene.

10. The epoxy resin of claim 1, wherein isooctyl polyhedral oligomeric silsesquioxane has an average particle size of 1 nm to 3 nm.

11. A surface coated with the epoxy resin of claim 1.

12. The surface of claim 11, wherein the surface is on an aircraft, a ship, or a vehicle.

13. The surface of claim 11, wherein the surface comprises a propeller blade.

14. A method for mitigating icing on a surface, the method comprising applying the epoxy resin of claim 1 on the surface.

15. An epoxy resin comprising a diamine, a bisphenol-A based epoxy, and isooctyl polyhedral oligomeric silsesquioxane in an amount of at least 0.5 percent by weight of the epoxy resin, wherein the epoxy resin has a wear index of at least 190 after 1200 wear cycles.

16. An epoxy resin comprising a diamine, a bisphenol-A based epoxy, isooctyl polyhedral oligomeric silsesquioxane in an amount of at least 0.5 percent by weight of the epoxy resin, and at least one of holey graphene or core-shell rubber particles.

* * * * *